(12) United States Patent
Kommidi et al.

(10) Patent No.: US 8,391,302 B1
(45) Date of Patent: Mar. 5, 2013

(54) HIGH-PERFORMANCE INGRESS BUFFER FOR A PACKET SWITCH

(75) Inventors: Raghunath Reddy Kommidi, Hyderbad (IN); David Alan Brown, Carp (CA)

(73) Assignee: Integrated Device Technology, Inc., San Jose, CA (US)

( * ) Notice: Subject to any disclaimer, the term of this patent is extended or adjusted under 35 U.S.C. 154(b) by 558 days.

(21) Appl. No.: 12/630,811

(22) Filed: Dec. 3, 2009

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |

(52) U.S. Cl. ......... 370/401; 370/229; 370/230; 370/351
(58) Field of Classification Search .................. None
See application file for complete search history.

(56) References Cited

U.S. PATENT DOCUMENTS

| | | | |
|---|---|---|---|
| 7,099,355 B1* | 8/2006 | Johnson et al. | 370/535 |
| 2004/0019729 A1* | 1/2004 | Kelley et al. | 710/306 |
| 2007/0047535 A1* | 3/2007 | Varma | 370/360 |
| 2009/0043984 A1* | 2/2009 | Chang et al. | 711/173 |
| 2009/0079748 A1* | 3/2009 | Greco et al. | 345/531 |
| 2009/0086735 A1* | 4/2009 | Tsang | 370/394 |

* cited by examiner

*Primary Examiner* — Hassan Phillips
*Assistant Examiner* — Lonnie Sweet
(74) *Attorney, Agent, or Firm* — Kenneth Glass; Stanley J. Pawlik; Glass & Associates

(57) ABSTRACT

A packet switch includes ingress ports, each of which contains a random access memory having a storage capacity for storing data. An ingress controller of the packet switch allocates the storage capacity of each random access memory among transaction types of packets by allocating credits to each of the transactions types for the random access memory. Each ingress port accepts packets based on the transaction types of the packets and the credits of the random access memory in the ingress port. Moreover, the ingress port stores accepted packets in the random access memory of the ingress port. In further embodiments, the ingress controller dynamically reallocates the credits of the random access memory in the ingress port during operation of the packet switch.

27 Claims, 10 Drawing Sheets

US 8,391,302 B1

HIGH-PERFORMANCE INGRESS BUFFER FOR A PACKET SWITCH

BACKGROUND

A packet switch typically includes a crossbar switch for routing packets. In this type of packet switch, packets are received at ingress ports and stored in respective ingress buffers. An arbiter then selects packets stored in the ingress buffers, and the crossbar switch simultaneously routes the selected packets to egress ports of the packet switch. In turn, the egress ports store the selected packets in respective egress buffers and then output the selected packets from the packet switch.

One metric for measuring performance of a packet switch is throughput. Throughput is typically defined as the number of packets routed through a packet switch in a given time period. Moreover, throughput of a packet switch may be adversely affected if the storage capacity of an ingress buffer in the packet switch is insufficient for a particular application of the packet switch. For this reason, storage capacities of ingress buffers are often important criteria in designing a packet switch. Because the throughput of a packet switch depends upon the storage capacities of the ingress buffers in the packet switch as well as the particular application of the packet switch, selection of the storage capacities often results in less than optimum throughput for different applications of the packet switch.

In some types of packet switches, an ingress port includes multiple ingress buffers, each of which is dedicated to a particular packet type. For example, an ingress port of a packet switch compliant with the peripheral component interconnect express (PCIe) 2.0 standard typically includes an ingress buffer for posted packets, another ingress buffer for non-posted packets, and still another ingress buffer for completion packets. In these types of packet switches, throughput may be adversely affected if the storage capacity of any of the ingress buffers of an ingress port is insufficient for a particular application of the packet switch.

In light of the above, a need exists for increasing throughput of a packet switch. A further need exists for increasing throughput of a packet switch compliant with the PCIe 2.0 standard.

SUMMARY

In various embodiments, a packet switch includes ingress ports, egress ports, and an ingress controller. Each of the ingress ports includes a random access memory having a storage capacity for storing data. The ingress controller allocates the storage capacity of each random access memory among transaction types of packets by allocating credits to each of the transactions types for that random access memory. Each of the ingress ports stores packets in the random access memory of that ingress port based on the credits of the random access memory and the transaction types of the packets. In further embodiments, the ingress controller is capable of dynamically reallocating the credits of a random access memory during operation of the packet switch.

Because the packet switch stores packets in random access memories of the ingress ports and allocates the storage capacity of each random access memory among transaction types of packets, a dedicated ingress buffer is not required for each of the transactions types in each of the ingress ports. As a result, each of the ingress ports consumes less die area and power in an integrated circuit device containing the packet switch. Moreover, credits may be allocated among transaction types for the random access memories of the ingress ports of the packet switch to increase (e.g., maximize) throughput of the packet switch for a particular application.

In accordance with one embodiment, an integrated circuit device includes a packet switch. The packet switch includes ingress ports, egress ports, and an ingress controller. The ingress ports are selectively coupled to the egress ports. The ingress controller is coupled to the ingress ports and the egress ports. Each of the ingress ports includes a corresponding ingress buffer including a random access memory. Moreover, the random access memory has a storage capacity for storing data. The ingress controller is configured to allocate the storage capacity of the random access memory in a selected ingress buffer of the ingress buffers among transactions types by allocating credits to each transaction type for the selected ingress buffer. The egress ports are configured to output packets from the packet switch.

In accordance with another embodiment, an integrated circuit device includes a packet switch. The packet switch includes ingress ports, egress ports, and an ingress controller. The ingress ports are selectively coupled to the egress ports. The ingress controller is coupled to the ingress ports and the egress ports. Each of the ingress ports includes a corresponding ingress buffer including a random access memory. Moreover, the random access memory has a storage capacity for storing data. The ingress controller is configured to allocate the storage capacity of the random access memory in a selected ingress buffer of the ingress buffers among transactions types by allocating credits to each transaction type for the selected ingress buffer. The credits of a transaction type include a header credit indicating a storage capacity of the random access memory of the selected ingress buffer for storing a packet header of a packet having the transaction type. Additionally, the credits of the transaction type include a data credit indicating a storage capacity of the random access memory of the selected ingress buffer for storing a data segment of a data payload of a packet having the transaction type. The egress ports are configured to output packets from the packet switch.

A method of routing packets through a packet switch, in accordance with one embodiment, includes selecting an ingress buffer in an ingress port of a packet switch. The ingress buffer includes a random access memory having a storage capacity for storing data. The method further includes allocating a storage capacity of the random access memory among transaction types by allocating credits to each of the transaction types for the selected ingress buffer. Additionally, the method includes issuing the credits from the packet switch, receiving a packet at the selected ingress buffer, and storing the packet in the random access memory of the selected ingress buffer. The method also includes identifying an egress port of the packet switch as a destination egress port for the packet and routing the packet from the selected ingress buffer to the destination egress port. Additionally, the method includes issuing at least one credit from the packet switch in response to routing the packet from the selected ingress buffer to the destination egress port.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a packet switch includes ingress ports, each of which contains a random access memory having a storage capacity for storing data. An ingress controller of the packet switch allocates the storage capacity of each random access memory among transaction types of packets by allocating credits to each of the transactions types for the random access memory. Each ingress port accepts packets based on the credits of the random access memory contained in the ingress port and the transaction types of the packets. Moreover, the ingress port stores accepted packets in the random access memory of the ingress port. In further embodiments, the ingress controller dynamically reallocates the credits of the random access memory during operation of the packet switch.

Because the packet switch stores packets in random access memories of the ingress ports and allocates the storage capacity of each random access memory among transaction types of packets, a dedicated ingress buffer is not required for each of the transactions types in each of the ingress ports. As a result, each of the ingress ports consumes less die area and power in an integrated circuit device containing the packet switch. Moreover, the credits may be allocated to the random access memories of the ingress ports of the packet switch to increase (e.g., maximize) throughput of the packet switch for a particular application.

Figure 1:
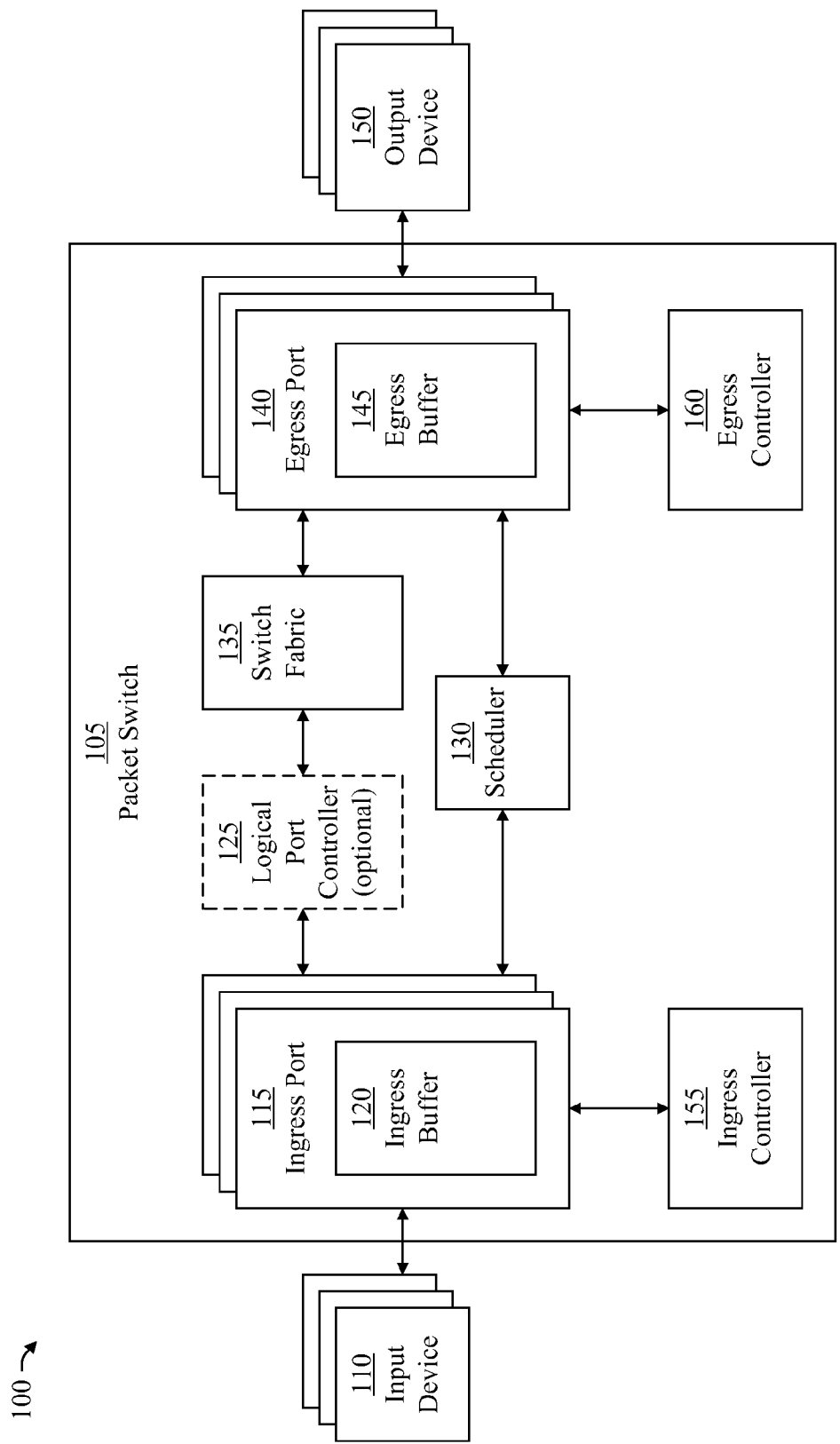
FIG. 1 is a block diagram of a communication system, in accordance with an embodiment of the present invention.

FIG. 1 illustrates a communication system 100, in accordance with an embodiment of the present invention. The communication system 100 includes a packet switch 105, input devices 110, and output devices 150. Each of the input devices 110 and each of the output devices 150 is coupled (e.g., connected) to the packet switch 105. The packet switch 105 receives packets from the input devices 110 and selectively routes the packets to the output devices 150 based on contents of the packets. For example, a packet routed by the packet switch 105 may include a destination identifier that identifies a destination of the packet. As another example, the packet switch 105 may determine a destination of the packet based on a transaction identifier that identifies a transaction type of the packet. Moreover, the packet switch 105 controls the flow of packets through the packet switch 105 based on the transaction types of the packets, as is described more fully herein.

In various embodiments, the packet switch 105 includes ingress ports 115, a scheduler 130, a switch fabric 135, egress port 140, an ingress controller 155, and an egress controller 160. Each of the ingress ports 115 includes an ingress buffer 120 and is coupled (e.g., connected) to the scheduler 130, the switch fabric 135, and the ingress controller 155. Each of the egress ports 140 includes an egress buffer 145 and is coupled (e.g., connected) to the scheduler 130, the switch fabric 135, and the egress controller 160. In some embodiments, the packet switch 105 includes an optional logical port controller 125 coupled to the ingress ports 115 and the switch fabric 135.

The switch fabric 135 may be any type of switch for routing packets. For example, the switch fabric 135 may be a crossbar switch. In various embodiments, the switch fabric 135 may route a packet from an ingress port 115 to an egress port 140 by routing portions of the packet in successive clock cycles of a clock signal in the packet switch 105 (e.g., successive scheduling cycles). The ingress controller 155 controls operation of the ingress ports 115, and the egress controller 160 controls operation of the egress ports 140, as is described more fully herein. In embodiments including the logical port controller 125, the logical port controller 125 creates logical ingress ports by combining ingress ports 115, as is also described more fully herein.

In operation, an ingress port 115 receives a packet from a corresponding input device 110 and writes (i.e., stores) the packet into the ingress buffer 120 of the ingress port 115, based on the transaction type of the packet. In turn, the ingress buffer 120 of the ingress port 115 stores the packet. The scheduler 130 selects packets stored in the ingress buffers 120 for routing to the egress ports 140. In this process, the scheduler 130 identifies one or more of the egress ports 140 as a destination egress port 140 for each of the selected packets, for example based on a destination identifier in the selected packet. The switch fabric 135 routes each of the selected packets stored in the ingress buffers 120 of the ingress ports 115 to each of the destination egress port 140 of the selected packet. For example, the scheduler 130 may schedule the selected packets in a scheduling cycle and the switch fabric 135 may route the selected packets in the next scheduling cycle. In some embodiments, a scheduling cycle is a clock cycle of a clock signal in the packet switch 105.

In some embodiments, the packet switch 105 is compliant with a Peripheral Component Interconnect Express™ (PCIe) standard maintained by the Peripheral Component Interconnect Special Interest Group (PCI-SIG). For example, the PCIe standard may be the PCIe base 2.0 specification or the PCIe base revision 2.1 specification. In these embodiments, the transaction types of the packets routed by the packet switch 105 include posted packets, non-posted packets, and completion packets. Moreover, each of the input devices 110 and output devices 150 may be endpoints.

In some embodiments, the packet switch 105 is implemented in an integrated circuit of an integrated circuit device which may include an integrated circuit package containing the integrated circuit. In other embodiments, the packet switch 105 is implemented in more than one integrated circuit of an integrated circuit device which may include a multichip package containing the integrated circuits.

In some embodiments, an ingress port 115 receives a packet by receiving a sequence of data portions of the packet in a corresponding sequence of time periods. In these embodiments, the scheduler 130 identifies an egress port 140 of the packet switch 105 as a destination egress port 140 for the packet and schedules the packet for routing from the ingress port 115 to the destination egress port 140 in a sequence of successive routing periods (e.g., successive scheduling cycles). Moreover, the scheduler 130 determines an initial routing period of the sequence of successive routing periods based on an input data bandwidth of the ingress port 115 and an output data bandwidth of the destination egress port 140 to prevent any discontinuity (e.g., idle packets) in routing the data portions from the ingress port 115 to the destination egress port 140 in the sequence of successive routing periods.

Figure 2:
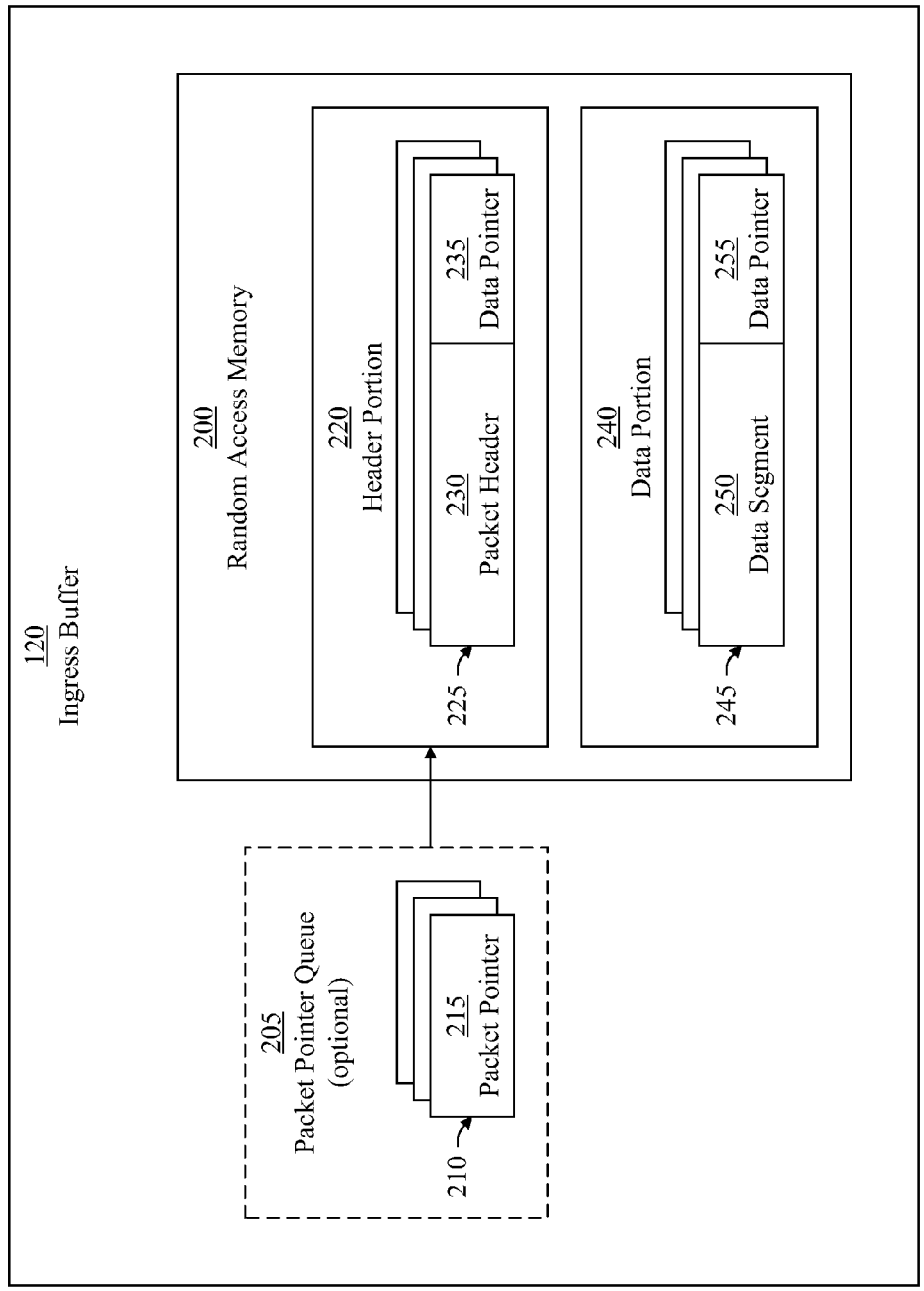
FIG. 2 is a block diagram of an ingress buffer, in accordance with an embodiment of the present invention.

FIG. 2 illustrates the ingress buffer 120, in accordance with an embodiment of the present invention. As illustrated in FIG. 2, the ingress buffer 120 includes a random access memory 200. The random access memory 200 may be any memory device or storage device in which data is accessed (e.g., stored or retrieved) in any order. For example, the random access memory 200 may be a static random access memory (SRAM), a dynamic random access memory (DRAM), a synchronous dynamic random access memory (SDRAM), an electrically-erasable read-only memory (EEROM), an electrically-erasable programmable read-only memory (EEPROM), a flash memory (e.g., flash storage), or the like. In some embodiments, the random access memory 200 is a volatile memory and in other embodiments the random access memory 200 is a nonvolatile memory.

The random access memory 200 includes a header portion 220 and a data portion 240. The header portion 220 includes storage units 225 and the data portion 240 includes storage units 245. For example, each of the storage units 225 and 245 may include a number of memory bits identified by a corresponding memory address. Each of the storage units 225 in the header portion 220 has a storage capacity for storing a packet header 230 of a packet and a data pointer 235 for identifying a storage unit 245 in the data portion 240 of the random access memory 200. Each of the storage units 245 in the data portion 240 has a storage capacity for storing a data segment 250 of a packet and a data pointer 255 identifying another storage unit 245 in the data portion 240 of the random access memory 200.

In operation, the ingress controller 155 stores a packet received by an ingress port 115 into the random access memory 200 in the ingress buffer 120 of the ingress port 115. In this process, the ingress controller 155 stores a packet header 230 of the packet into a storage unit 225 in the header portion 220 of the random access memory 200. If the packet has a data payload, the ingress controller 155 stores each data segment 250 of the data payload into a corresponding storage unit 245 in the data portion 240 of the random access memory 200. Each of the data segments 250 of the packet may be any unit of data such as, for example, a data byte, a data word, a double data word, or the like. Additionally, the ingress controller 155 stores a data pointer 235 into the storage unit 225 containing the packet header 230. The data pointer 235 stored in the storage unit 225 identifies the storage unit 245 in the data portion 240 containing the first data segment 250 of the packet. In this way, the ingress controller 155 links the packet header 230 of the packet to the first data segment 250 of the packet.

If the data payload of the packet includes only one data segment 250, the storage unit 245 containing the first data segment 250 of the packet also contains a null data pointer 255. For example, the ingress controller 155 may write a null data pointer 255 into the storage unit 245 containing the first data segment 250. Otherwise, if the data payload of the packet includes more than one data segment 250, the ingress controller 155 writes a data pointer 255 identifying the next data segment 250 of the packet into the storage unit 245 containing the first data segment 250. In this way, the ingress controller 155 links the first data segment 250 of the packet to the second data segment 250 of the packet. Moreover, the ingress controller 155 repeats this process for any additional data segment 250 in the data payload of the packet. In this way, the ingress controller 155 writes the packet into the random access memory 200 and links the packet header 230 to each data segment 250 in the data payload of the packet.

In some embodiments, the ingress buffer 120 includes an optional packet pointer queue 205 including storage units 210. The packet pointer queue 205 may be any memory device or storage device for storing data and for reading the stored data based on the order in which the data is written (i.e. stored) into the packet pointer queue 205. For example, the packet pointer queue 205 may be a first-in-first-out (FIFO) queue and each of the storage units 210 may be a register in the FIFO queue. Each of the storage units 210 of the packet pointer queue 205 has a storage capacity for storing a packet pointer 215 identifying a storage unit 225 in the header portion 220 of the random access memory 200 containing a packet header 230 of a packet. In this way, the packet pointer 215 identifies the packet containing the packet header 230.

In various embodiments, each of the storage units 225 and each of the storage units 245 in the random access memory 200 is identified by a unique memory address having a number of address bits. In these embodiments, each of the storage units 210 in the packet pointer queue 205 and each packet pointer 215 stored in a storage unit 210 includes a number of data bits that is less than the number of address bits in a memory address of the random access memory 200. Nonetheless, each of the packet pointers 215 identifies a unique storage unit 225 in the header portion 220 of the random access memory 200. For example, the header portion 220 of the random access memory 200 may be identified by memory addresses in a lower memory address range and the data portion 240 of the random access memory 200 may be identified by memory addresses in a higher memory address range.

Because the number of data bits in each of the storage units 210 of the packet pointer queue 205 is less than the number of address bits in a memory address of the random access memory 200, the die area and power consumed in an integrated circuit device containing the packet pointer queue 205 in reduced (e.g. minimized). Moreover, because the die area and the power consumed by each of the packet pointer queues 205 in the packet switch 105 is reduced, the die area and power consumed in the integrated circuit device containing the packet switch 105 is reduced (e.g., minimized). In various embodiments, each storage unit 210 of the packet pointer queue 205 has a storage capacity for storing a number of data bits in a range of one data bit to four data bits. For example, each storage unit 210 of the packet pointer queue 205 may have a storage capacity of three data bits. As another example, each storage unit 210 of the packet pointer queue 205 may have a storage capacity of four data bits.

In embodiments including the logical port controller 125, the logical port controller 125 creates logical ingress ports by combining the random access memories 200 of two or more ingress ports 115. For example, the logical port controller 125 may include circuitry, such as multiplexers and demultiplexers, for selectively coupling (e.g., connecting) two or more random access memories 200 to a same input of the switch fabric 135. Moreover, each of the ingress buffers 120 in the logical ingress port has an input data bandwidth and the logical ingress port has an input data bandwidth that is higher than the input data bandwidth of each of the ingress buffer 120. In various embodiments, the ingress controller 155 controls operation of the logical port controller 125 based on input to the packet switch 105. For example, the input to the packet switch 105 may be provided by system software of the communication system 100.

Figure 3:
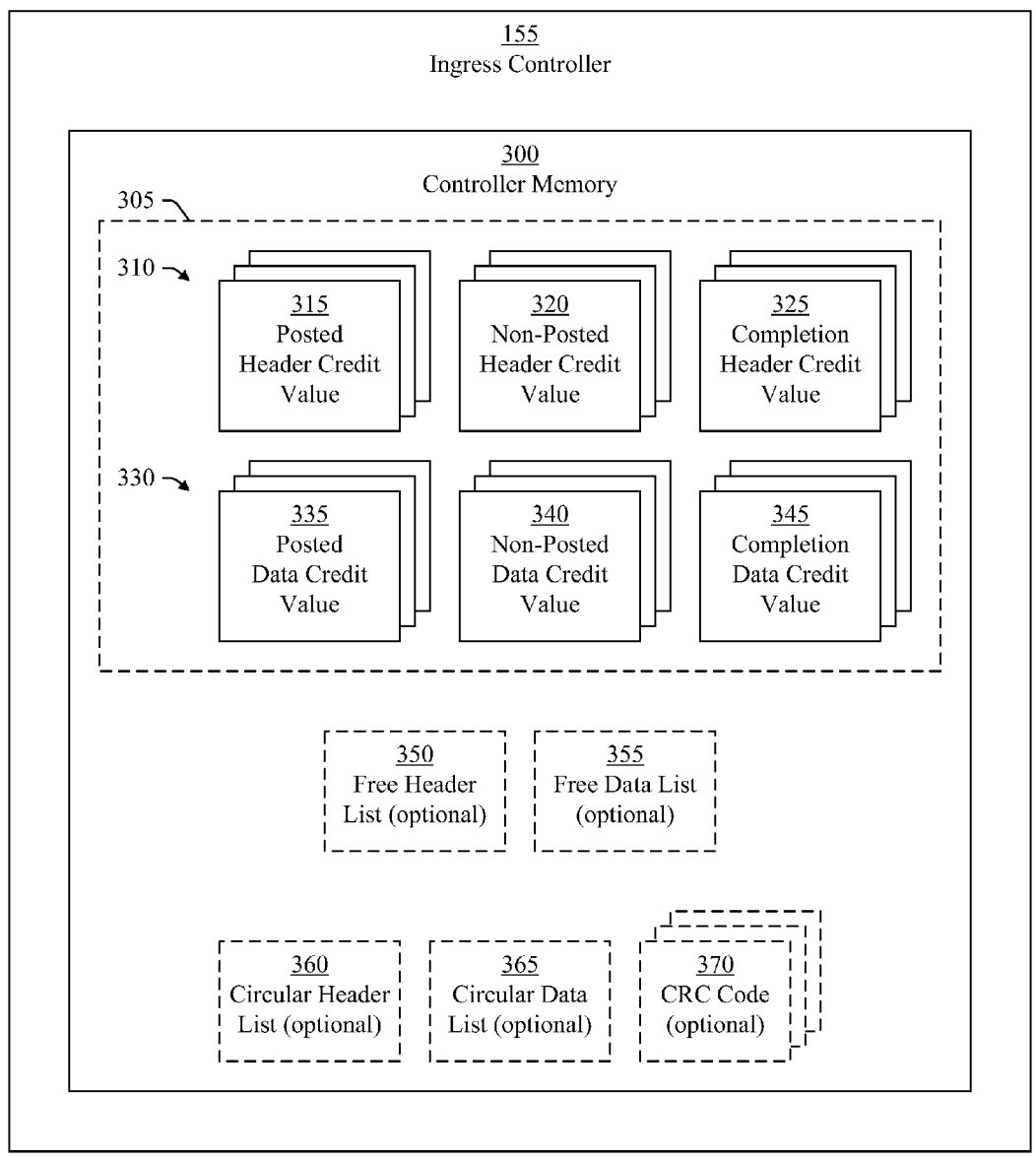
FIG. 3 is a block diagram of an ingress controller, in accordance with an embodiment of the present invention.

FIG. 3 illustrates the ingress controller 155, in accordance with an embodiment of the present invention. The ingress controller 155 includes a controller memory 300. For example, the controller memory 300 may be a random access memory (RAM). As is described more fully herein, the ingress controller 155 allocates credits to transactions types of packets for the ingress buffers 120 in the ingress ports 115 by storing credit values 305 into the controller memory 300. Each credit value 305 of an ingress buffer 120 indicates a number of credits allocated to a transaction type for the ingress buffer 120. Moreover, the number of credits may be zero credits, one credit, or more than one credit.

In various embodiments, the credit values 305 include header credit values 310 and data credit values 330. Each header credit value 310 of an ingress buffer 120 indicates a number of header credits allocated to the ingress buffer 120. Moreover, the header credit value 310 indicates an available storage capacity in the header portion 220 of the random access memory 200 for storing a packet header 230. For example, the header credit value 310 may indicate a number of storage units 225 available in the header portion 220 of the random access memory 200 for storing a packet header 230 along with a corresponding data pointer 235. Each data credit value 330 of an ingress buffer 120 indicates a number of data credits allocated to the ingress buffer 120. Moreover, the data credit value 330 indicates an available storage capacity in the data portion 240 of the random access memory 200 for storing a data segment 250. For example, the data credit value 330 may indicate a number of storage units 245 available in the data portion 240 of the random access memory 200 for storing a data segment 250 along with a corresponding data pointer 235.

In various embodiments, the ingress controller 155 allocates header credits and data credits for an ingress buffer 120 of an ingress port 115 among transactions types of packets by writing (e.g., storing) corresponding header credit values 310 and data credit values 330 into the controller memory 300. In this way, the ingress controller 155 allocates the storage capacity of the random access memory 200 in the ingress buffer 120 of the ingress port 115 among the transaction types. In these embodiments, the transaction types include a posted transaction type, a non-posted transaction type, and a completion transaction type. For example, the transaction types may be specified in the PCIe 2.0 specification. Moreover, the ingress controller 155 allocates posted header credits and posted data credits to posted transactions by writing corresponding posted header credit values 315 and posted data credit values 335 to the controller memory 300. Additionally, the ingress controller 155 allocates non-posted header credits and non-posted data credits to non-posted transactions by writing corresponding non-posted header credit values 320 and non-posted data credit values 340 to the controller memory 300. Further, the ingress controller 155 allocates completion header credits and completion data credits to completion transactions by writing corresponding completion header credit values 325 and completion data credit values 345 to the controller memory 300.

Each of the posted header credit values 315, the non-posted header credit values 320, and the completion header credit values 325 indicates an available storage capacity in the header portion 220 of the random access memory 200 for storing a packet header 230 of a packet having the corresponding transaction type. Each of the posted data credit values 335, the non-posted data credit values 340, and the completion data credit values 345 indicates an available storage capacity in the data portion 240 of the random access memory 200 for storing a data segment 250 of a packet having the corresponding transaction type.

In various embodiments, the ingress controller 155 issues the header credits and data credits of an ingress buffer 120 to the input device 110 corresponding (e.g., coupled) to the ingress port 115 including the ingress buffer 120. For example, the ingress controller 155 may issue the header credits and data credits by providing the corresponding header credit value 310 and data credit value 330 to the ingress buffer 120. In turn, the input device 110 determines based on the header credit value 310 and the data credit value 330 whether the ingress buffer 120 in the ingress port 115 has an available storage capacity for storing a packet of each of the transaction types. If the input device 110 determines that the ingress buffer 120 of the ingress port 115 has an available storage capacity for storing a packet of a particular transaction type, the input device 110 may provide (e.g., transmit) a packet having the particular transaction type to the ingress port 115. Otherwise, if the input device 110 determines that the ingress buffer 120 of the ingress port 115 does not have an available storage capacity for storing a packet of the particular transaction type, the input device 110 does not provide a packet of the particular transaction type to the ingress port 115.

In response to receiving a packet from the input device 110, the ingress port 115 stores the packet into the random access memory 200 of the ingress buffer 120 in the ingress port 115. In this way, the ingress port 115 accepts the packet received from the input device 110. Additionally, the ingress controller 155 updates (e.g., decrements) the header credit value 310 of the ingress buffer 120 having the transaction type of the packet to indicate that a header credit of the transaction type is released. As a result, the header credit value 310 reflects a reduced available storage capacity of the header portion 220 of the random access memory 200 in the ingress buffer 120 for storing packet headers 230 of packets having the transaction type. If the packet includes a data payload including data segments 250, the ingress controller 155 also updates (e.g., decrements) the data credit value 330 of the ingress buffer 120 having the transaction type of the packet to indicate that one or more data credits of the transaction type is released. As a result, the data credit value 330 reflects a reduced available storage capacity of the data portion 240 of the random access memory 200 in the ingress buffer 120 for storing data segments 250 of packets having the transaction type.

The scheduler 130 selects the packet in the ingress port 115 and identifies an egress port 140 as a destination egress port 140 for the packet. In turn, the switch fabric 135 routes the packet to the destination egress port 140 and the destination egress port 140 stores the packet into the egress buffer 145 of the egress port 140. Moreover, the ingress controller 155 updates (e.g., increments) the header credit value 310 and the data credit value 330 of the ingress buffer 120 to reflect an increased available storage capacity of the header portion 220 of the random access memory 200 for storing a packet header 230 and an increased available storage capacity of the data portion 240 of the random access memory 200 for storing data segments 250. Further, the egress port 140 provides (e.g., transmits) the packet to the output device 150 corresponding (e.g., coupled) to the egress port 140. In this way, the egress port 140 outputs the packet from the packet switch 105.

If an ingress port 115 receives a packet and the ingress buffer 120 of the ingress port 115 does not have available storage capacity for storing the packet, the ingress port 115 does not store the packet into the random access memory 200 of the ingress buffer 120. In this way, the ingress port 115 rejects the packet. In various embodiments, an ingress port 115 rejects a packet by discarding the packet and sending a message to the corresponding input device 110 indicating that the packet is rejected. For example, the ingress port 115 may send an acknowledgement (ACK) to the corresponding input device 110 if the ingress port 115 accepts a packet and may send a negative acknowledgment (NAK) to the corresponding input device 110 if the ingress port 115 rejects a packet.

In some embodiments, the transaction types of packets include posted transactions, non-posted transactions, and completion transactions. In these embodiments, the ingress controller 155 allocates the storage capacity of the header portion 220 of a random access memory 200 among posted transactions, non-posted transactions, and completion transactions. Additionally, the ingress controller 155 allocates the storage capacity of the data portion 240 of the random access memory 200 among the transaction types by allocating the storage capacity of the data portion 240 among posted transactions, non-posted transactions, and completion transactions.

In some embodiments, the ingress controller 155 allocates the storage capacity of the header portion 220 of a random access memory 200 among posted transactions, non-posted transactions, and completion transactions. Additionally, the ingress controller 155 allocates the storage capacity of the data portion 240 of the random access memory 200 among the transaction types by allocating the storage capacity among posted transactions and completion transactions. In these embodiments, the ingress controller 155 does not allocate a portion of the storage capacity of the data portion 240 of the random access memory 200 among non-posted transactions. Moreover, the packet switch 105 routes a non-posted packet received by the packet switch 105 if the non-posted packet is a header packet (i.e., a packet including a packet header 230 but not including a data payload) and discards the non-posted packet if the non-posted packet is a data packet (i.e., a packet including a packet header 230 and a data payload).

In these embodiments, the ingress controller 155 need not allocate a non-posted data credit to the random access memory 200 because the data portion 240 of the random access memory 200 does not store data segments 250 of non-posted packets. In some embodiments, the ingress controller 155 may allocate a non-posted data credit to the random access memory 200 indicating the data portion 240 of the random access memory 200 does not have a storage capacity for storing data segments 250 of non-posted packets, for example by setting the non-posted data credit value 340 to zero.

In some embodiments, the ingress controller 155 maintains an optional free header list 350 and an optional free data list 355 for each ingress buffer 120. In these embodiments, the controller memory 300 stores the free header list 350 and the free data list 355. The free header list 350 identifies storage units 225 in the header portion 220 of the random access memory 200 in the ingress buffer 120 available for storing a packet header 230 and an associated data pointer 235. The free data list 355 identifies storage units 245 in the data portion 240 of the random access memory 200 of the ingress buffer 120 available for storing a data segment 250 and an associated data pointer 255. The ingress controller 155 accesses the free header list 350 and the free data list 355 of an ingress buffer 120 to identify available storage units 225 and 245 in the random access memory 200 for storing packets received by the ingress port 115 containing the ingress buffer 120. In this way, the ingress controller 155 may quickly identify an available storage unit 225 in the header portion 220 of a random access memory 200 or an available storage unit 245 in the data portion 240 of the random access memory 200, or both.

In some embodiments, the ingress controller 155 maintains an optional circular header list 360 and an optional circular data list 365 for each ingress buffer 120. In these embodiments, the controller memory 300 stores the circular header list 360 and the circular data list 365. The circular header list 360 identifies each storage unit 225 in the header portion 220 of the random access memory 200 in the ingress buffer 120 containing a packet header 230 and an associated data pointer 235. The circular data list 365 identifies each storage unit 245 in the data portion 240 of the random access memory 200 of the ingress buffer 120 containing a data segment 250 and an associated data pointer 255. The ingress controller 155 maintains the circular header list 360 and the circular data list 365 according to the order in which the ingress buffer 120 stores packets in the random access memory 200 of the ingress buffer 120. Moreover, the ingress controller 155 deletes packets from the random access memory 200 by modifying the circular header list 360 and the circular data list 365, as is described more fully herein.

In some embodiments, the ingress controller 155 computes a cyclical redundancy check (CRC) code 370 for a packet received by an ingress port 115. In these embodiments, the controller memory 300 stores the cyclical redundancy check code 370. For example the cyclical redundancy check code 370 may be a link cyclical redundancy check (LCRC) code of a data link layer as described in the PCIe 2.0 specification. In these embodiments, the ingress controller 155 determines if the packet is a corrupt packet based on the cyclical redundancy check code 370 computed for the packet. If the ingress controller 155 determines that the packet is a corrupt packet, the ingress controller 155 deletes the packet from the random access memory 200 of the ingress port 115 by modifying the circular header list 360 and the circular data list 365, as is described more fully herein. Further, the ingress controller 155 may send a message to the input device 110 corresponding to the ingress port 115 indicating that the packet was rejected by the ingress port 115.

In these embodiments, the ingress controller 155 modifies the circular header list 360 and the circular data list 365 to delete packets from the random access memory 200 which have been routed to an egress port 140 and modifies the circular header list 360 and the circular data list 365 to delete corrupt packets from the random access memory 200. Moreover, the ingress controller 155 uses the same circuitry for deleting routed packets from the random access memory 200 and deleting corrupt packets from the random access memory 200, which reduces (e.g., minimizes) the size and power consumption of the circuitry. As a result, size and power consumption of the packet switch 105 are reduced (e.g., minimized).

Moreover, the ingress controller 155 need not access the random access memory 200 to delete a routed packet or a corrupt packet from the random access memory 200, which would otherwise consume memory bandwidth of the random access memory 200. For example, the ingress controller 155 may delete a routed packet (e.g., a header packet) from the random access memory 200 of an ingress port 115 by modifying the circular header list 360 of the ingress port 115 in a clock cycle of a clock signal in the packet switch 105 and write (i.e., store) another packet or a portion of another packet into the random access memory 200 in the same clock cycle. In this way, the ingress controller 155 simultaneously deletes a packet from the random access memory 200 and writes (i.e., stores) at least a portion of another packet into the random access memory 200.

As another example, the ingress controller 155 may delete a routed packet (e.g., a data packet) from the random access memory 200 of an ingress port 115 by modifying both the circular header list 360 and the circular data list 365 of the ingress port 115 in a clock cycle of a clock signal in the packet switch 105 and write (i.e., store) another packet or a portion of another packet into the random access memory 200 in the same clock cycle. In this way, the ingress controller 155 simultaneously deletes a packet from the random access memory 200 and writes (i.e., stores) at least a portion of another packet into the random access memory 200.

In various embodiments, the ingress controller 155 dynamically reallocates the storage capacity of the random access memory 200 in an ingress buffer 120 by deallocating one or more of the credits allocated to a transaction type for the ingress buffer 120 and allocating one or more additional credits to another transaction type for the selected ingress buffer 120 during operation of the packet switch 105. For example, the ingress controller 155 may receive an input (e.g., data or a signal) indicating that a header credit is to be dynamically reallocated from a first transaction type to a second transaction type for the ingress buffer 120. Further in this example, the ingress buffer 120 receives a header packet (e.g., a non-posted packet) having the first transaction type and stores the header packet in the random access memory 200 of the ingress buffer 120. In response, the ingress controller 155 releases a header credit allocated to the first transaction type for the ingress buffer 120. In this way, the ingress controller 155 deallocates the header credit.

Additionally, the switch fabric 135 routes the header packet to an egress port 140 and the ingress controller 155 deletes the header packet from the random access memory 200 by modifying the circular header list 360 of the ingress buffer 120. Further in this example, the ingress controller 155 allocates a header credit to the second transaction type for the ingress buffer 120 in response to the deletion of the header packet from the random access memory 200 by modifying (i.e., incrementing) the header credit value 310 of the second transaction type for the ingress buffer 120. In this example, however, the ingress controller 155 does not allocate a header credit to the first transaction type for the ingress buffer 120 in response to the deletion of the header packet from the random access memory 200. In this way, a header credit is dynamically reallocated from the first transaction type to the second transaction type for the ingress buffer 120.

As another example, the ingress controller 155 may receive an input (e.g., data or a signal) indicating that a data credit is to be dynamically reallocated from a first transaction type to a second transaction type for the ingress buffer 120. Additionally, the ingress buffer 120 receives a data packet (e.g., a posted packet) having the first transaction type and stores the data packet in the random access memory 200 of the ingress buffer 120. In response, the ingress controller 155 releases a header credit and a data credit allocated to the first transaction type of the ingress buffer 120. In this way, the ingress controller 155 deallocates the header credit and the data credit.

Additionally, the switch fabric 135 routes the data packet to an egress port 140 and the ingress controller 155 deletes the data packet from the random access memory 200 by modifying both the circular header list 360 and the circular data list 365 of the ingress buffer 120. Further in this example, the ingress controller 155 allocates a header credit to the first transaction type for the ingress buffer 120 by modifying (i.e., incrementing) the header credit value 310 of the second transaction type for the ingress buffer 120 in response to the deletion of the data packet from the random access memory 200. Additionally, the ingress controller 155 allocates a data credit to the second transaction type for the ingress buffer 120 by modifying (i.e., incrementing) the data credit value 330 of the second transaction type for the ingress buffer 120 in response to the deletion of the data packet from the random access memory 200. In this way, a data credit is dynamically reallocated from the first transaction type to the second transaction type for the ingress buffer 120. In this example, however, the ingress controller 155 does not allocate a data credit to the first transaction type for the ingress buffer 120 in response to the deletion of the data packet from the random access memory 200.

As still another example, the ingress controller 155 may receive an input (e.g., data or a signal) indicating that a data credit is to be dynamically reallocated from a first transaction type to a second transaction type for the ingress buffer 120. Additionally, the ingress buffer 120 receives a data packet (e.g., a posted packet) having the first transaction type and stores the data packet in the random access memory 200 of the ingress buffer 120. In this example, the ingress buffer 120 stores more than one data segment 250 into the random access memory 200 for the data packet. Further, the ingress controller 155 releases a header credit allocated to the first transaction type for the random access memory 200 and releases a number of data credits allocated to the first transaction type for the random access memory 200 equal to the number of data segments 250 of the data packet stored in the random access memory 200. In this way, the ingress controller 115 releases the header credit and the number of data credits.

In this example, the ingress controller 155 allocates a header credit to the first transaction type for the ingress buffer 120 by modifying (i.e., incrementing) the header credit value 310 of the first transaction type for the ingress buffer 120 in response to the deletion of the data packet from the random access memory 200. Additionally, the ingress controller 155 allocates a number of data credits to the first transaction type for the ingress buffer 120 that is one less than the number of data segments 250 of the data packet deleted from the random access memory 200 by modifying (i.e., incrementing) the data credit value 330 of the first transaction type for the ingress buffer 120 in response to the deletion of the data packet from the random access memory 200. Further, the ingress controller 155 allocates a data credit to the second transaction type for the ingress buffer 120 by modifying (i.e., incrementing) the data credit value 330 of the second transaction type for the ingress buffer 120 in response to the deletion of the data packet from the random access memory 200. In this way, one data credit is dynamically reallocated from the first transaction type to the second transaction type for the ingress buffer 120.

In some embodiments, the ingress controller 155 includes circuitry for monitoring the ingress buffers 120. In these embodiments, the ingress controller 155 dynamically reallocates the storage capacities of the random access memories 200 in the ingress buffers 120 by dynamically reallocating credits among transaction types for the ingress buffers 120. In one embodiment, the ingress controller 155 maintains a count for each transaction type indicating the number of packets of the transaction type received by an ingress buffer 120 in a monitoring period. Further, the ingress controller 155 dynamically reallocates the credits allocated to the transaction types for the ingress buffer 120 based on the counts to increase throughput of the ingress buffer 120. For example, credits may be deallocated from a transaction type having a lower count and additional credits may be allocated to a transaction type having a higher count. In this way, ingress controller 155 dynamically reallocates credits among the ingress buffers 120 of the packet switch 105 to increase throughput of the packet switch 105.

Figure 4:
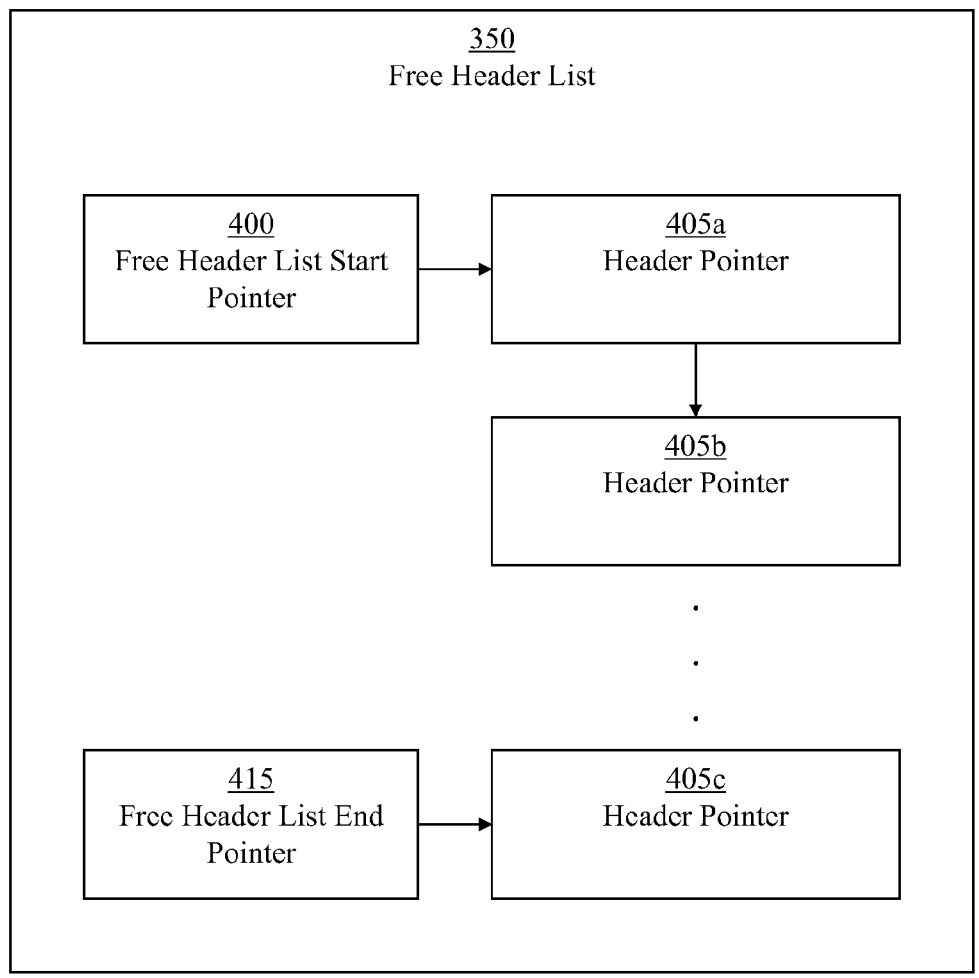
FIG. 4 is a block diagram of a free header list, in accordance with an embodiment of the present invention.

FIG. 4 illustrates the free header list 350, in accordance with an embodiment of the present invention. The free header list 350 is associated with a corresponding ingress buffer 120 of an ingress port 115 and includes header pointers 405 (e.g., header pointers 405a-c), a free header list start pointer 400, and a free header list end pointer 415. Each of the header pointers 405 identifies a storage unit 225 in the header portion 220 of the random access memory 200 in the ingress buffer 120 available for storing a packet header 230 and an associated data pointer 235. Moreover, each of the header pointers 405 identifies the next header pointer 405, if any, in the free header list 350. The free header list start pointer 400 identifies the header pointer 405 at the start of the free header list 350 (e.g., the first header pointer 405a). The free header list end pointer 415 identifies the header pointer 405 at the end of the free header list 350 (e.g., the header pointer 405c).

The ingress controller 155 accesses the free header list 350 to identify an available storage unit 225 in the header portion 220 of the random access memory 200 in the ingress buffer 120 for storing a packet header 230 of a packet received by the ingress port 115. For example, the ingress controller 155 may identify the header pointer 405 at the start of the free header list 350 based on the free header list start pointer 400 and identify the storage unit 225 in the header portion 220 of the random access memory 200 based on that header pointer 405 at the start of the free header list 350.

The ingress controller 155 deletes the header pointer 405 at the start of the free header list 350 when the storage unit 225 in the header portion 220 of the random access memory 200 identified by the header pointer 405 is no longer available (i.e., unavailable). For example, the storage unit 225 identified by the header pointer 405 at the start of the free header list 350 may become unavailable when the ingress controller 155 writes (i.e., stores) a packet header 230 into the storage unit 225. In various embodiments, the ingress controller 155 deletes the header pointer 405 at the start of the free header list 350 by modifying the free header list start pointer 400 to identify the next header pointer 405 in the free header list 350 (e.g., the header pointer 405b).

Additionally, the ingress controller 155 adds a header pointer 405 at the end of the free header list 350 when a storage unit 225 in the header portion 220 of the random access memory 200 becomes available. For example, the storage unit 225 may become available when the ingress controller 155 deletes a packet header 230 stored in the storage unit 225. In various embodiments, the ingress controller 155 adds a new header pointer 405 at the end of the free header list 350 by modifying the header pointer 405 at the end of the free header list 350 (e.g., the header pointer 405c) to identify the new header pointer 405 and modifying the free header list end pointer 415 to identify the new header pointer 405. Moreover, the new header pointer 405 identifies the storage unit 225 in the header portion 220 of the random access memory 200 that has become available.

Figure 5:
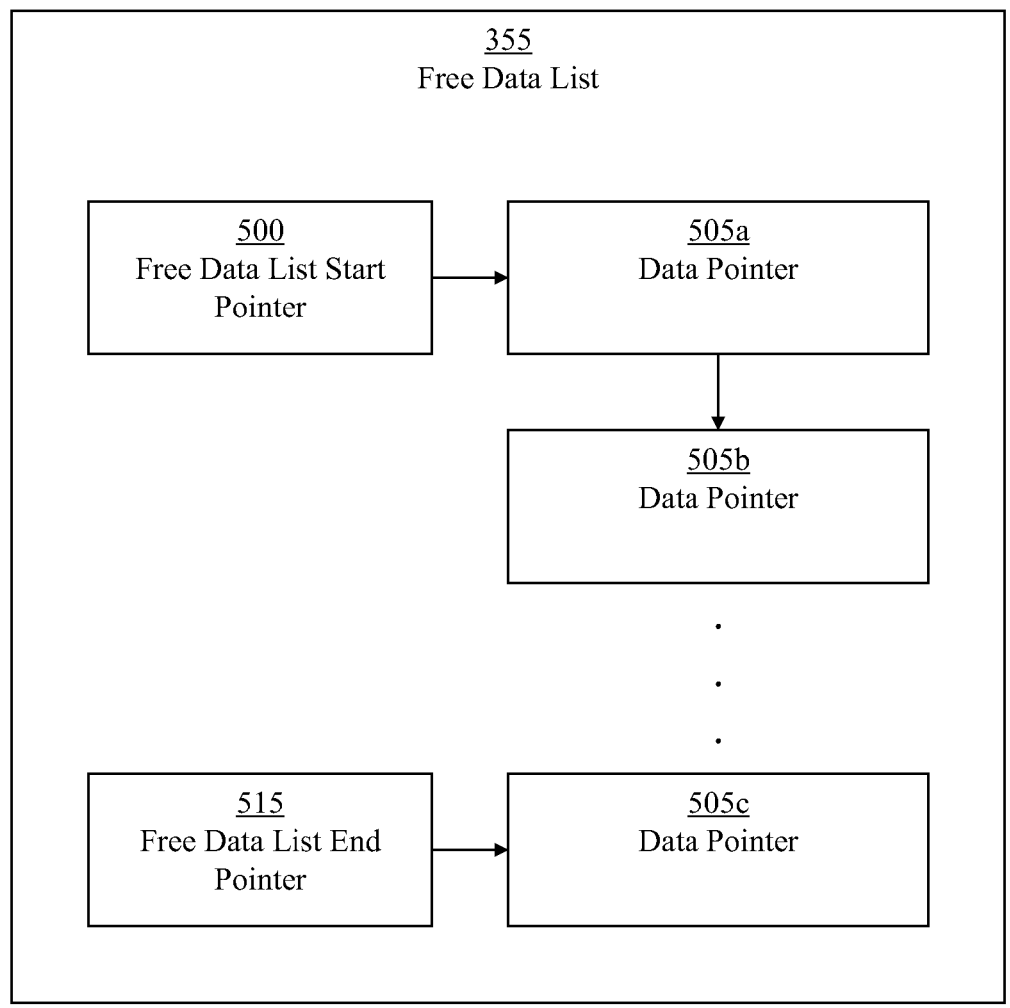
FIG. 5 is a block diagram of a free data list, in accordance with an embodiment of the present invention.

FIG. 5 illustrates the free data list 355, in accordance with an embodiment of the present invention. The free data list 355 is associated with a corresponding ingress buffer 120 of an ingress port 115 and includes data pointers 505 (e.g., data pointers 505a-c), a free data list start pointer 500, and a free data list end pointer 515. Each of the data pointers 505 identifies a storage unit 245 in the data portion 240 of the random access memory 200 in the ingress buffer 120 available for storing both a data segment 250 and a data pointer 255 associated with the data segment 250. Moreover, each of the data pointers 505 identifies the next data pointer 505, if any, in the free data list 355. The free data list start pointer 500 identifies the data pointer 505 at the start of the free data list 355 (e.g., the first data pointer 505a). The free data list end pointer 515 identifies the data pointer 505 at the end of the free data list 355 (e.g., the data pointer 505c).

The ingress controller 155 accesses the free data list 355 to identify an available storage unit 245 in the data portion 240 of the random access memory 200 in the ingress buffer 120 for storing a data segment 250 of a packet received by the ingress port 115. For example, the ingress controller 155 may identify the data pointer 505 at the start of the free data list 355 based on the free data list start pointer 500 and identify the storage unit 245 in the data portion 240 of the random access memory 200 based on the data pointer 505 at the start of the free data list 355.

The ingress controller 155 deletes the data pointer 505 at the start of the free data list 355 when the storage unit 245 in the data portion 240 of the random access memory 200 identified by the data pointer 505 is no longer available (i.e., unavailable). For example, the storage unit 245 identified by the data pointer 505 at the start of the free data list 355 may become unavailable when the ingress controller 155 writes (i.e., stores) a data segment 250 into the storage unit 245. In various embodiments, the ingress controller 155 deletes the data pointer 505 at the start of the free data list 355 by modifying the free data list start pointer 500 to identify the next data pointer 505 in the free data list 355 (e.g., the data pointer 505b).

Additionally, the ingress controller 155 adds a data pointer 505 at the end of the free data list 355 when a storage unit 245 in the data portion 240 of the random access memory 200 becomes available. For example, the storage unit 245 may become available when the ingress controller 155 deletes a data segment 250 stored in the storage unit 245. In various embodiments, the ingress controller 155 adds a new data pointer 505 at the end of the free data list 355 by modifying the data pointer 505 at the end of the free data list 355 (e.g., the data pointer 505c) to identify the new data pointer 505 and modifying the free data list end pointer 515 to identify the new data pointer 505. Moreover, the new data pointer 505 identifies the storage unit 245 in the data portion 240 of the random access memory 200 that has become available.

Figure 6:
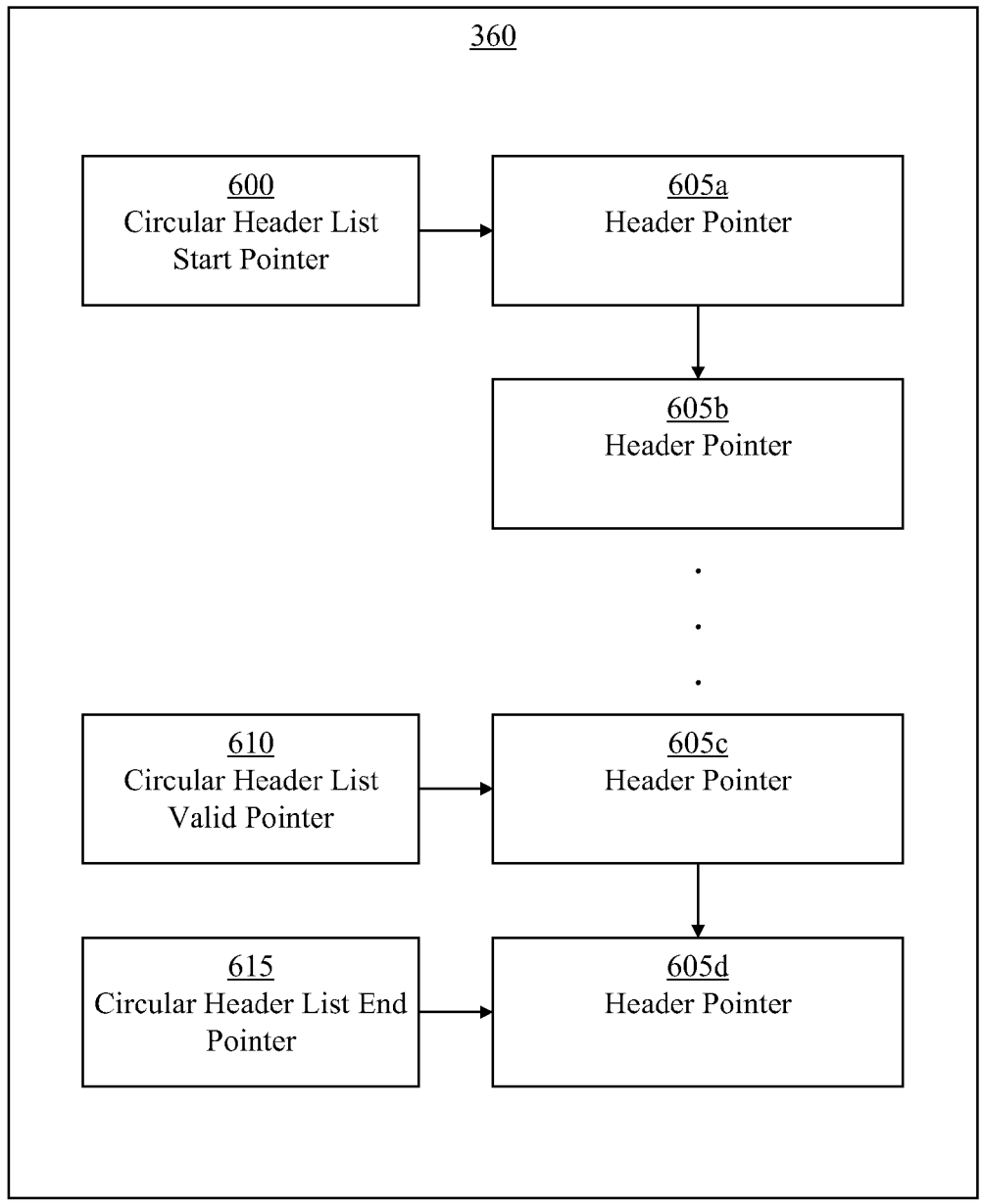
FIG. 6 is a block diagram of a circular header list, in accordance with an embodiment of the present invention.

FIG. 6 illustrates the circular header list 360, in accordance with an embodiment of the present invention. The circular header list 360 is associated with a corresponding ingress buffer 120 of an ingress port 115 and includes header pointers 605 (e.g., header pointers 605a-d), a circular header list start pointer 600, a circular header list valid pointer 610, and a circular header list end pointer 615. Each of the header pointers 605 identifies a storage unit 225 in the header portion 220 of the random access memory 200 in the ingress buffer 120 containing a packet header 230 and an associated data pointer 235. Moreover, each of the header pointers 605 identifies the next header pointer 605, if any, in the circular header list 360.

The circular header list start pointer 600 identifies the header pointer 605 at the start of the circular header list 360 (e.g., the first header pointer 605a). The circular header list end pointer 615 identifies the header pointer 605 at the end of the circular header list 360 (e.g., the header pointer 605d). The circular header list valid pointer 610 identifies the header pointer 605 identifying the storage unit 225 in the header portion 220 of the random access memory 200 which contains the packet header 230 of the last valid packet stored in the random access memory 200. In various embodiments, the circular header list valid pointer 610 identifies the header pointer 605 (e.g., the header pointer 605c) immediately preceding the header pointer 605 at the end of the circular header list 360, which also identifies the header pointer 605 at the end of the circular header list 360 (e.g., the header pointer 605d).

The ingress controller 155 adds a header pointer 605 at the end of the circular header list 360 when the ingress controller 155 writes (i.e., stores) a packet header 230 of a packet into a storage unit 225 in the header portion 220 of the random access memory 200. Moreover, the header pointer 605 added at the end of the circular header list 360 identifies the storage unit 225 containing the packet header 230. In various embodiments, the ingress controller 155 adds the header pointer 605 (i.e., new header pointer 605) at the end of the circular header list 360 by modifying the header pointer 605 at the end of the circular header list 360 (e.g., the header pointer 605d) to identify the new header pointer 605 and modifying the circular header list end pointer 615 to identify the new header pointer 605.

Additionally, the ingress controller 155 deletes a packet header 230 stored in a storage unit 225 of the header portion 220 of the random access memory 200 by deleting the header pointer 605 identifying the storage unit 225 from the circular header list 360. For example, the ingress controller 155 may delete the packet header 230 stored in the storage unit 225 identified by the header pointer 605 when the switch fabric 135 routes the packet containing the packet header 230 to the destination egress port 140 of the packet. In various embodiments, the ingress controller 155 deletes the header pointer 605 at the start of the circular header list 360 (e.g., the header pointer 605a) by modifying the circular header list start pointer 600 to identify the next header pointer 605 in the circular header list 360 (e.g., the header pointer 605b).

In embodiments in which the ingress controller 155 computes a cyclical redundancy check code 370 for a packet received at an ingress port 115, the ingress controller 155 deletes the packet header 230 of a corrupt packet from the random access memory 200 by deleting the header pointer 605 identifying the storage unit 225 containing the packet header 230 of the corrupt packet from the circular header list 360. In various embodiments, the ingress controller 155 deletes the packet header 230 of the corrupt packet from the random access memory 200 by identifying the header pointer 605 identified by the circular header list valid pointer 610 (e.g., the header pointer 605c) and modifying the circular header list end pointer 615 to identify the header pointer 605 identified by the circular header list valid pointer 610 (e.g., the header pointer 605c).

Figure 7:
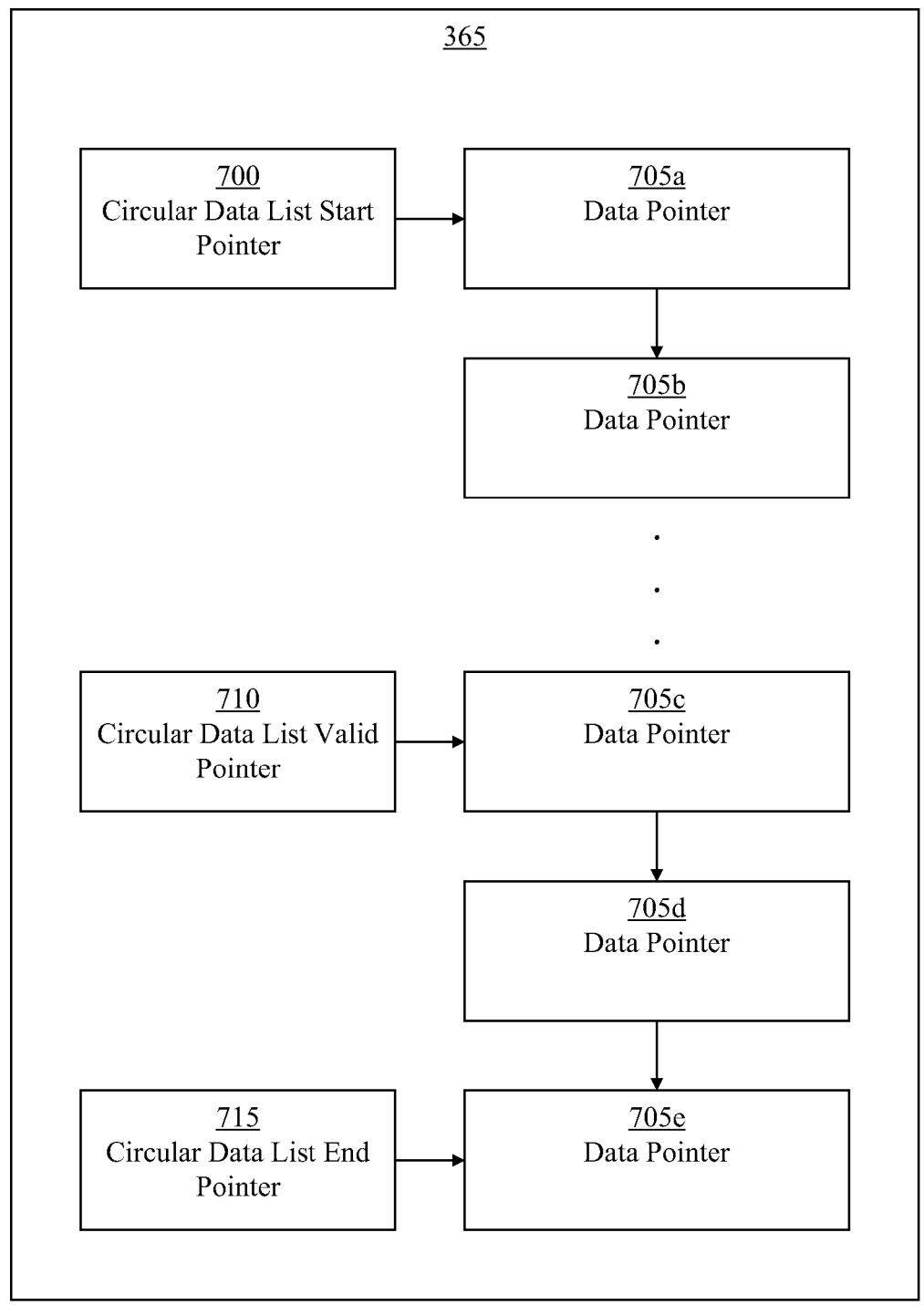
FIG. 7 is a block diagram of a circular data list, in accordance with an embodiment of the present invention.

FIG. 7 illustrates the circular data list 365, in accordance with an embodiment of the present invention. The circular data list 365 is associated with a corresponding ingress buffer 120 of an ingress port 115 and includes data pointers 705 (e.g., data pointers 705a-e), a circular data list start pointer 700, a circular data list valid pointer 710, and a circular data list end pointer 715. Each of the data pointers 705 identifies a storage unit 245 in the data portion 240 of the random access memory 200 in the ingress buffer 120 containing both a data segment 250 and a data pointer 255 associated with the data segment 250. Moreover, each of the data pointers 705 identifies the next data pointer 705, if any, in the circular data list 365.

The circular data list start pointer 700 identifies the data pointer 705 at the start of the circular data list 365 (e.g., the first data pointer 705a). The circular data list end pointer 715 identifies the data pointer 705 at the end of the circular data list 365 (e.g., the data pointer 705e). The circular data list valid pointer 710 identifies the data pointer 705 that identifies the storage unit 245 in the data portion 240 of the random access memory 200 containing the first data segment 250 of the last valid packet stored in random access memory 200 (e.g., the data pointer 705c).

The ingress controller 155 adds a data pointer 705 at the end of the circular data list 365 when the ingress controller 155 writes (i.e., stores) a data segment 250 of a packet into a storage unit 245 in the data portion 240 of the random access memory 200. Moreover, the data pointer 705 added at the end of the circular data list 365 identifies the storage unit 245 containing the data segment 250. In various embodiments, the ingress controller 155 adds the data pointer 705 (i.e., new data pointer 705) at the end of the circular data list 365 by modifying the data pointer 705 at the end of the circular data list 365 (e.g., the data pointer 705e) to identify the new data pointer 705 and modifying the circular data list end pointer 715 to identify the new data pointer 705.

Additionally, the ingress controller 155 deletes a data segment 250 stored in a storage unit 245 of the data portion 240 of the random access memory 200 by deleting the data pointer 705 identifying the storage unit 245 from the circular data list 365. For example, the ingress controller 155 may delete the data segment 250 stored in the storage unit 245 identified by the data pointer 705 when the switch fabric 135 routes the packet containing the data segment 250 to the destination egress port 140 of the packet. In various embodiments, the ingress controller 155 deletes the data pointer 705 at the start of the circular header list 360 (e.g., the data pointer 705a) by modifying the circular data list start pointer 700 to identify the next data pointer 705 in the circular data list 365 (e.g., the data pointer 705b).

In embodiments in which the ingress controller 155 computes a cyclical redundancy check code 370 for a packet received at an ingress port 115, the ingress controller 155 deletes each data segment 250, if any, of a corrupt packet from the random access memory 200 by deleting the data pointer 705 identifying the storage unit 245 containing the data segment 250 of the corrupt packet from the circular data list 365. In various embodiments, the ingress controller 155 deletes each data segment 250 of the corrupt packet from the random access memory 200 by identifying the data pointer 705 identified by the circular data list valid pointer 710 (e.g., the data pointer 705c) and modifying the circular data list end pointer 715 to identify the data pointer 705 identified by the circular data list valid pointer 710 (e.g., the data pointer 705c).

Figure 8:
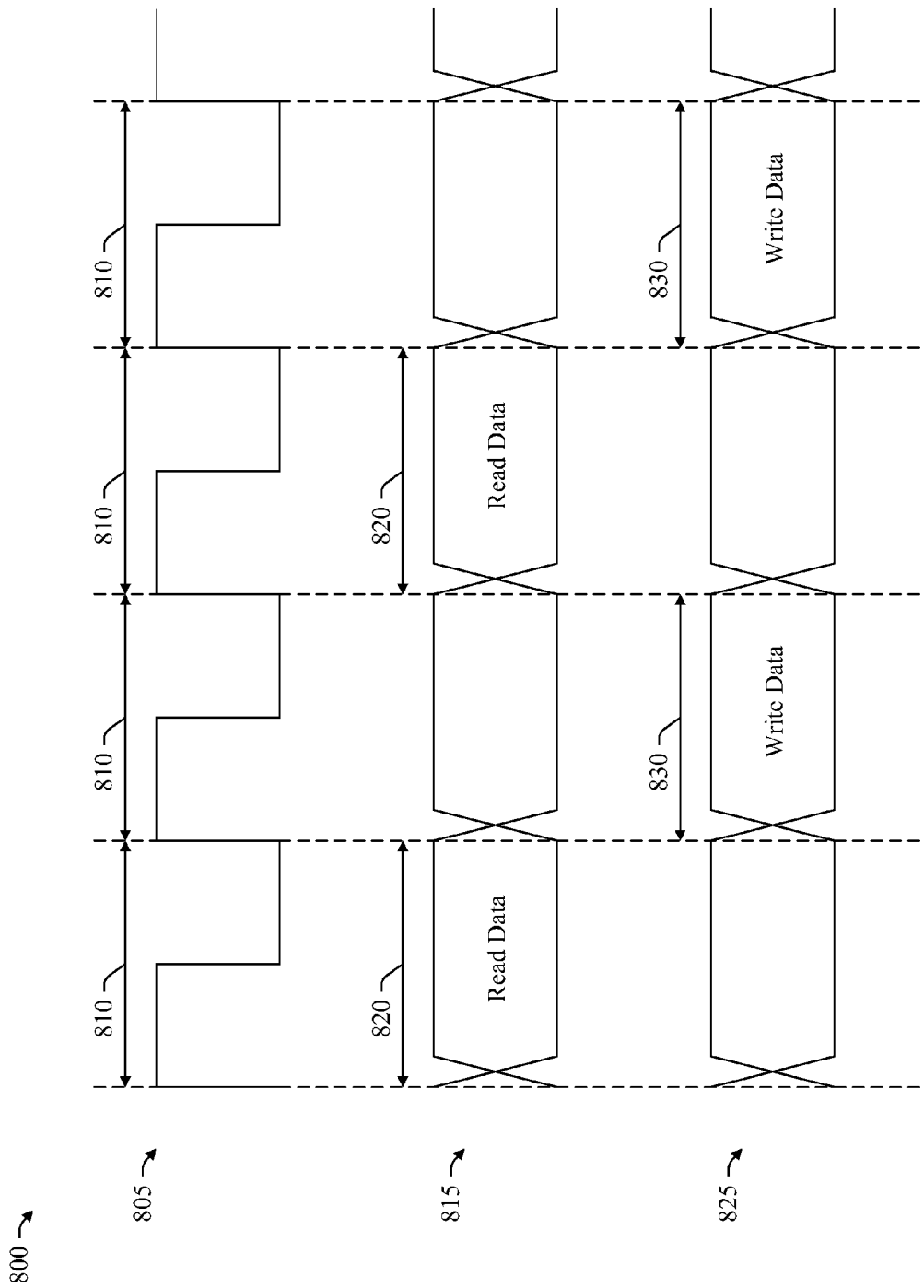
FIG. 8 is a timing diagram of random access memory signals, in accordance with an embodiment of the present invention.

FIG. 8 illustrates random access memory signals 800, in accordance with an embodiment of the present invention. The random access memory signals 800 include a clock signal 805, a read data signal 815, and a write data signal 825. The clock signal 805 includes clock cycles 810, each of which has the duration of a clock period. The read data signal 815 includes read cycles 820, each of which has the duration of the clock period of the clock cycle 810. The write data signal 825 includes write cycles 830, each of which has the duration of the clock period of the clock cycle 810.

The packet switch 105 reads data from a random access memory 200 in the packet switch 105 during the read cycles 820 of the read data signal 815 and writes data into the random access memory 200 during the write cycles 830 of the write data signal 825. As illustrated in FIG. 8, the read cycles 820 and the write cycles 830 are alternating cycles corresponding to the clock cycles 810 of the clock signal 805. Because the read cycles 820 and the write cycles 830 are alternating cycles, the random access memory 200 need not be a dual port memory in this embodiment.

In various embodiments, the random access memory 200 is a single port memory, which consumes less area and static power in an integrated circuit device than a dual port memory of the same storage capacity. In this way, the random access memory 200 reduces area and power consumption of the packet switch 105 in those embodiments in which the packet switch 105 is contained in an integrated circuit device.

Figure 9:
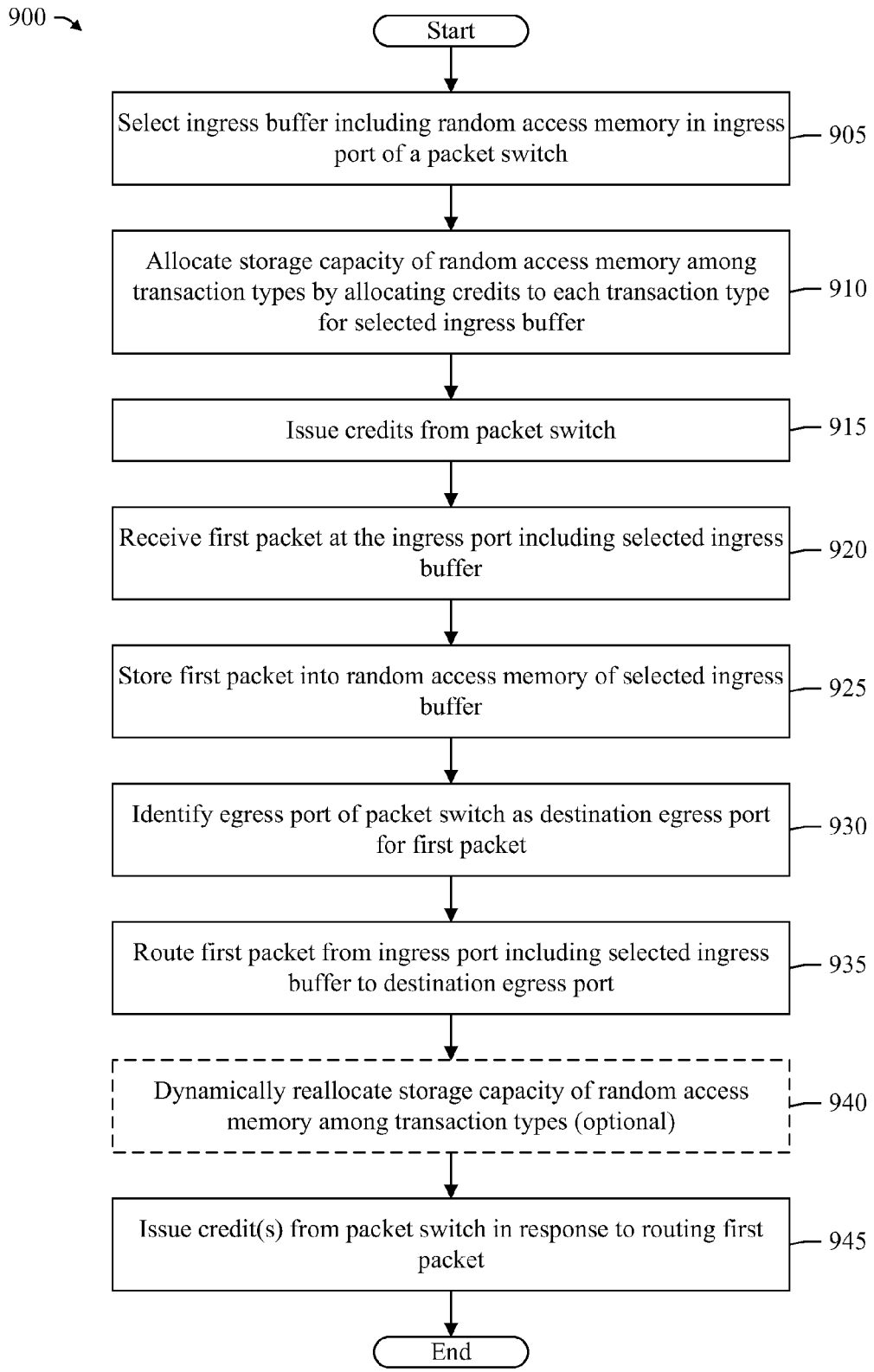
FIG. 9 is a flow chart of a method of routing a packet through a packet switch, in accordance with an embodiment of the present invention.

FIG. 9 is a flow chart of a method 900 of routing a packet through a packet switch, in accordance with an embodiment of the present invention. In step 905, an ingress buffer including a random access memory in an ingress port of a packet switch is selected. In various embodiments, the ingress controller 155 selects an ingress buffer 120 including a random access memory 200 in an ingress port 115 of the packet switch 105. For example, the ingress controller 155 may select the ingress buffer 120 based on an input to the packet switch 105. The method 900 then proceeds to step 910.

In step 910, a storage capacity of the random access memory is allocated among transaction types by allocating credits to each of the transaction types for the selected ingress buffer. In various embodiments, the ingress controller 155 allocates a storage capacity of the random access memory 200 in the selected ingress buffer 120 among transaction types of packets by allocating credits to each of the transaction types for the selected ingress buffer 120, for example by writing (i.e., storing) credit values 305 into the controller memory 300. In this way, the ingress controller 155 associates the credits with the selected ingress buffer 120.

In some embodiments, the ingress controller 155 allocates header credits and data credits to each of the transactions types for the selected ingress buffer 120 by writing (i.e., storing) a header credit value 310 of the transaction type for the selected ingress buffer 120 into the controller memory 300 and writing (i.e., storing) a data credit value 330 of the transaction type for the ingress buffer 120 into the controller memory 300. For example, the ingress controller 155 may allocate a posted header credit and a posted data credit to a posted transaction type by writing (i.e., storing) a posted header credit value 315 and a posted data credit value 335 into the controller memory 300. Additionally, the ingress controller 155 may allocate a non-posted header credit and a non-posted data credit to a non-posted transaction type by writing (i.e., storing) a non-posted header credit value 320 and a non-posted data credit value 340 into the controller memory 300. Further, the ingress controller 155 may allocate a completion header credit and a completion data credit to a completion transaction type by writing (i.e., storing) a completion header credit value 325 and a completion data credit value 345 into the controller memory 300. The method 900 then proceeds to step 915.

In step 915, credits are issued from the packet switch. In various embodiments, the ingress controller 155 issues the credits from the packet switch 105 and the ingress port 115 including the selected ingress buffer 120 provides the credits to the input device 110 corresponding (e.g., coupled) to the ingress port 115, for example by providing credit values 305 of the selected ingress buffer 120 to the input device 110. In this way, the packet switch 105 advertises the credits of the selected ingress buffer 120 to the input device 110. In turn, the input device 110 determines whether the ingress port 115 including the selected ingress buffer 120 has capacity to store a packet based on the credits (e.g., the credit values 305). The method 900 then proceeds to step 920.

In step 920, a first packet is received at the ingress port including the selected ingress buffer. In various embodiments, the ingress port 115 including the selected ingress buffer 120 receives the first packet. For example, the ingress port 115 including the selected ingress buffer 120 may receive the first packet from the corresponding input device 110 coupled to the ingress port 115. The method 900 then proceeds to step 925.

In step 925, the first packet is stored in the random access memory of the selected ingress buffer. In various embodiments, the ingress controller 155 stores the first packet into the random access memory 200 of the selected ingress buffer 120. If the first packet includes a packet header 230 but does not include a data payload, the ingress controller 155 stores the first packet into the random access memory 200 by storing the packet header 230 into the header portion 220 of the random access memory 200. Otherwise, if the first packet includes a packet header 230 and a data payload, the ingress controller 155 stores the first packet into the random access memory 200 by storing the packet header 230 into the header portion 220 of the random access memory 200 and storing one or more data segments 250 including data of the data payload into the data portion 240 of the random access memory 200. The method 900 then proceeds to step 930.

In step 930, an egress port of the packet switch is identified as a destination egress port for the first packet. In various embodiments, the scheduler 130 identifies an egress port 140 of the packet switch 105 as a destination egress port 140 for the first packet based on the content of the first packet. For example, the scheduler 130 may identify one or more egress ports 140 of the packet switch 105 as a destination egress port 140 for the first packet based on a destination identifier or a transaction identifier in the packet header 230 of the first packet. The method 900 then proceeds to step 935.

In step 935, the first packet is routed from the ingress port including the selected ingress buffer to the destination egress port of the first packet. In various embodiments, the switch fabric 135 routes the first packet from the ingress port 115 including the selected ingress buffer 120 to each destination egress port 140 of the first packet. Also in step 935, the ingress controller 155 deletes the packet from the random access memory 200 of the selected ingress buffer 120, as is described more fully herein. The method 900 then proceeds to step 940.

In optional step 940, the storage capacity of the random access memory is dynamically reallocated among the transaction types. In various embodiments, the ingress controller 155 dynamically reallocates the storage capacity of the random access memory 200 in the selected ingress buffer 120 by deallocating at least one of the credits allocated to a transaction type for the selected ingress buffer 120 and allocating at least one credit to another transaction type for the selected ingress buffer 120 during operation of the packet switch 105. For example, the ingress controller 155 may reallocate the storage capacity of the random access memory 200 in the selected ingress buffer 120 based on input received by the packet switch 105 during operation of the packet switch 105. The method 900 then proceeds to step 945.

In step 945, an additional credit is issued from the packet switch. In various embodiments, the ingress controller 155 issues one or more additional credits to the transaction type of the first packet for the selected ingress buffer 120. In embodiments in which the storage capacity of the random access memory 200 in the selected ingress buffer 120 has been reallocated among the transaction types for the selected ingress buffer 120, the ingress controller 155 issues one or more additional credits to the transaction type for which additional credits have been allocated for the selected ingress buffer 120. The method 900 then ends.

In various embodiments, the method 900 may include more or fewer than the steps 905-945 illustrated in FIG. 9 and described above. In some embodiments, the steps 905-945 of the method 900 may be performed in a different order than the order illustrated in FIG. 9 and described above. In some embodiments, some of the steps 905-945 of the method 900 may be performed in parallel or substantially simultaneously. In various embodiments, one or more of the steps 905-945 may be performed more than once in the method 900.

Figure 10:
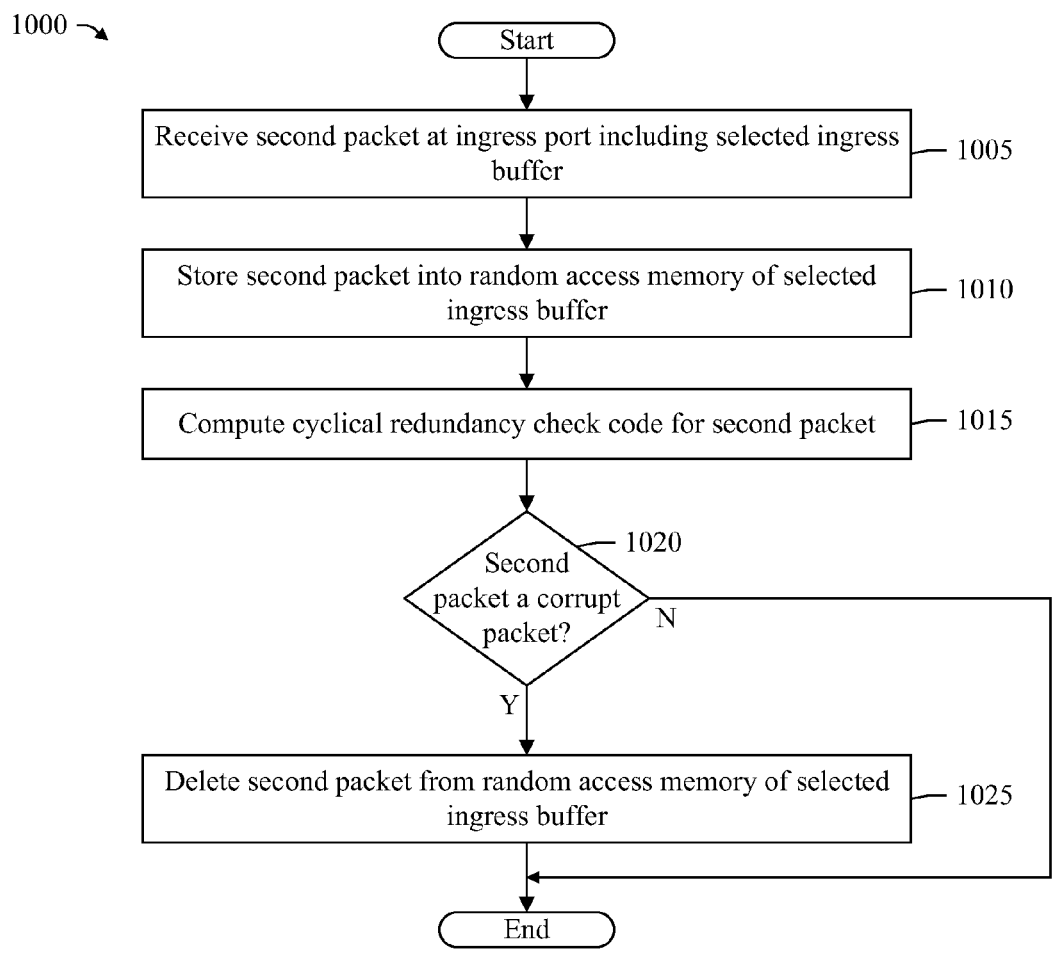
FIG. 10 is a flow chart of a portion of a method of routing a packet through a packet switch, in accordance with an embodiment of the present invention.

FIG. 10 is a flow chart of a portion 1000 of the method 900 of routing a packet through a packet switch, in accordance with an embodiment of the present invention. In various embodiments, the portion 1000 of the method 900 is performed after the step 945 of the method 900 illustrated in FIG. 9.

In step 1005, a second packet is received at the ingress port including the selected ingress buffer. In various embodiments, the ingress port 115 including the selected ingress buffer 120 receives the second packet. For example, the ingress port 115 including the selected ingress buffer 120 may receive the second packet from the corresponding input device 110 coupled to the ingress port 115. The method 900 then proceeds to step 1010.

In step 1010, the second packet is stored in the random access memory of the selected ingress buffer. In various embodiments, the ingress controller 155 stores the second packet in the random access memory 200 of the selected ingress buffer 120. The method 900 then proceeds to step 1015.

In step 1015, a cyclical redundancy check code is computed for the second packet. In various embodiments, the ingress controller 155 computes a cyclical redundancy check code 370 for the second packet. For example, the second packet may include a packet header 230 but not include a data payload. In this example, the second packet is a header packet and the ingress controller 155 computes the cyclical redundancy check code 370 for the second packet based on the packet header 230 of the second packet. As another example, the second packet may include a packet header 230 and a data payload. In this example, the ingress controller 155 computes the cyclical redundancy check code 370 for the second packet based on the packet header 230 and each data segment 250 of the second packet.

In various embodiments, the ingress controller 155 computes the cyclical redundancy check code 370 for the second packet as the ingress port 115 including the selected ingress buffer 120 receives each portion of the second packet. For example, the ingress controller 155 may compute a partial cyclical redundancy check code 370 based on a first portion of the second packet received by the ingress port 115 and update the partial cyclical redundancy check code 370 based on each subsequent portion of the second packet received by the ingress port 115. In this example, the cyclical redundancy check code 370 of the second packet is generated by updating the partial cyclical redundancy check code based on the last portion of the second packet received by the ingress port 115 including the selected ingress buffer 120.

In one embodiment, the ingress controller 155 computes the cyclical redundancy check code 370 of the second packet and writes (i.e., stores) the last portion of the second packet into the random access memory 200 of the selected ingress buffer 120 in parallel. In this way, the ingress controller 155 computes the cyclical redundancy check code 370 of the second packet and writes (i.e., stores) the last portion of the second packet into the random access memory 200 of the selected ingress buffer 120 substantially simultaneously. The method 900 then proceeds to step 1020.

In step 1020, it is determined whether the second packet is a corrupt packet. In various embodiments, the ingress controller 155 determines whether the second packet is a corrupt packet based on the cyclical redundancy check code 370 of the second packet. For example, the ingress controller 155 may compare the cyclical redundancy check code 370 of the second packet with a checksum in the packet header 230 of the second packet.

If the cyclical redundancy check code 370 of the second packet is equal to the checksum in the packet header 230 of the second packet, the ingress controller 155 determines that the second packet is not a corrupt packet and the portion 1000 of the method 900 ends. Otherwise, if the cyclical redundancy check code 370 of the second packet is not equal to the checksum in the packet header 230 of the second packet, the ingress controller 155 determines that the second packet is a corrupt packet and the method 900 proceeds to step 1025.

In step 1025, the second packet is deleted from the random access memory of the selected ingress buffer. In various embodiments, the ingress controller 155 deletes the second packet from the random access memory 200 of the selected ingress buffer 120. If the second packet is a header packet (i.e., a packet including a packet header 230 but not including a data payload), the ingress controller 155 deletes the second packet from the random access memory 200 of the selected ingress buffer 120 by deleting the header pointer 605 in the circular header list 360 identifying a storage unit 225 in the header portion 220 of the random access memory 200 containing the packet header 230 of the second packet. Otherwise, if the second packet is a data packet (i.e., a packet including a packet header 230 and a data payload), the ingress controller 155 deletes the header pointer 605 in the circular header list 360 and also deletes each data pointer 705 in the circular data list 365 identifying a storage unit 245 in the data portion 240 of the random access memory 200 containing a data segment 250 of a data payload of the second packet. This portion 1000 of the method 900 then ends.

In various embodiments, the portion 1000 of the method 900 may include more or fewer than the steps 1005-1025 illustrated in FIG. 10 and described above. In some embodiments, the steps 1005-1025 of the method 900 may be performed in a different order than the order illustrated in FIG. 10 and described above. In some embodiments, some of the steps 1005-1025 of the method 900 may be performed in parallel or substantially simultaneously. In various embodiments, one or more of the steps 1005-1025 may be performed more than once in the method 900.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. An integrated circuit device including a packet switch, the packet switch comprising:
   a plurality of egress ports configured to output packets from the packet switch;
   a plurality of ingress ports selectively coupled to the plurality of egress ports and including a corresponding plurality of ingress buffers each comprising a random access memory having a storage capacity for storing data including a header portion including a plurality of storage units each having a storage capacity for storing a packet header and a data portion including a plurality of storage units each having a storage capacity for storing a data segment, wherein a storage unit of the plurality of storage units in the header portion of the random access memory is configured to store both a packet header of a packet and a data pointer to a storage unit in the data portion of the random access memory for storing a first data segment of a data payload of the packet; and an ingress controller coupled to the plurality of ingress ports and configured to allocate the storage capacity of the random access memory in a selected ingress buffer of the plurality of ingress buffers among a plurality of transactions types by allocating a plurality of credits to each transaction type of the plurality of the transaction types for the selected ingress buffer.

2. The integrated circuit device of claim 1, wherein the storage unit in the data portion of the random access memory for storing the first data segment of the data payload of the packet further is configured to store a data pointer to another storage unit in the data portion of the random access memory for storing a second data segment of the data payload of the packet.

3. The integrated circuit device of claim 1, wherein each of the storage units in the header portion and the data portion of the random access memory is identified by a corresponding memory address having a number of address bits, the selected ingress buffer comprises a packet pointer queue comprising a plurality of registers each configured to store a packet pointer including a number of data bits for identifying a storage unit in the header portion of the random access memory, and the number of data bits is less than the number of address bits.

4. The integrated circuit device of claim 1, wherein the selected ingress buffer is further configured to write the packet into the random access memory of the selected ingress buffer during write cycles and read the packet from the random access memory during read cycles, the write cycles and the read cycles corresponding to alternating cycles of a clock signal in the packet switch.

5. The integrated circuit device of claim 1, wherein the ingress controller is further configured to maintain a free header list containing header pointers each identifying an available storage unit in the header portion of the random access memory and to maintain a free data list containing data pointers each identifying an available storage unit in the data portion of the random access memory.

6. The integrated circuit device of claim 1, wherein the ingress controller is further configured to maintain a circular header list containing header pointers each identifying a storage unit in the header portion of the random access memory containing a packet header.

7. The integrated circuit device of claim 6, wherein the ingress controller is further configured to compute a cyclical redundancy check code for a packet stored in the random access memory of the selected ingress buffer, determine whether the stored packet is a corrupt packet based on the cyclical redundancy check code, and delete the stored packet from the random access memory of the selected input buffer if the stored packet is a corrupt packet by deleting from the circular header list the header pointer identifying a storage unit in the header portion of the random access memory storing the packet header of the corrupt packet.

8. The integrated circuit device of claim 7, wherein the ingress controller is further configured to maintain a circular data list configured to store data pointers each identifying a storage unit in the data portion of the random access memory containing a data segment of a packet, the ingress controller further configured to delete from the circular data list each data pointer identifying a storage unit in the data portion of the random access memory storing a data segment of the corrupt packet.

9. The integrated circuit device of claim 1, wherein the ingress controller is further configured to logically combine the random access memories of at least two ingress buffers of the plurality of ingress buffers into a logical ingress port, each of the at least two ingress buffers having an input data bandwidth, the logical ingress port having an input data bandwidth being higher than the input data bandwidth of each ingress buffer of the at least two ingress buffers.

10. The integrated circuit device of claim 1, wherein the selected ingress port is further configured to receive a packet by receiving a sequence of data portions of the packet in a corresponding sequence of time periods, the packet switch further comprising a scheduler coupled to the plurality of ingress ports and the plurality of egress ports and configured to identify an egress port of the plurality of egress ports as a destination egress port for the packet, schedule the packet for routing from the selected ingress port to the destination egress port in a sequence of successive routing periods, and determine an initial routing period of the sequence of successive routing periods based on an input data bandwidth of the selected ingress port and an output data bandwidth of the destination egress port to prevent any discontinuity in routing the data portions in the sequence of successive routing periods.

11. The integrated circuit device of claim 1, wherein the packet switch is compliant with a Peripheral Component Interconnect Express 2.0 specification.

12. An integrated circuit device including a packet switch, the packet switch comprising:

a plurality of egress ports configured to output packets from the packet switch;

a plurality of ingress ports selectively coupled to the plurality of egress ports and including a corresponding plurality of ingress buffers each comprising a random access memory having a storage capacity for storing data; and an ingress controller coupled to the plurality of ingress ports and configured to allocate the storage capacity of the random access memory in a selected ingress buffer of the plurality of ingress buffers among a plurality of transactions types by allocating a plurality of credits to each transaction type of the plurality of the transaction types for the selected ingress buffer, the plurality of credits of each transaction type of the plurality of transaction type including a header credit indicating an available storage capacity of the random access memory of the selected ingress buffer for storing a packet header of a packet having the transaction type, and a data credit indicating an available storage capacity of the random access memory of the selected ingress buffer for storing a data segment of a data payload of the packet having the transaction type, and wherein the ingress controller is further configured to maintain a free header list containing header pointers each identifying an available storage unit in a header portion of the random access memory and to maintain a free data list containing data pointers each identifying an available storage unit in a data portion of the random access memory.

13. The integrated circuit device of claim 12, wherein the ingress controller is further configured to dynamically reallocate the storage capacity of the random access memory in the selected ingress buffer among the plurality of transaction types by deallocating at least one credit of the plurality of credits allocated to a first transaction type of the plurality of transaction types and allocating at least one credit to a second transaction type of the plurality of transaction types.

14. The integrated circuit device of claim 12, wherein the random access memory comprises:

a header portion including a plurality of storage units each having a storage capacity for storing a packet header; and a data portion including a plurality of storage units each having a storage capacity for storing a data segment, wherein a storage unit of the plurality of storage units in the header portion of the random access memory is configured to store both a packet header of a packet and a data pointer to a storage unit in the data portion of the random access memory for storing a first data segment of a data payload of the packet.

15. The integrated circuit device of claim 14, wherein the selected ingress buffer is further configured to write the packet into the random access memory of the selected ingress buffer during write cycles and read the packet from the random access memory during read cycles, the write cycles and the read cycles corresponding to alternating cycles of a clock signal in the packet switch.

16. The integrated circuit device of claim 14, wherein each of the storage units in the header portion and the data portion of the random access memory is identified by a corresponding memory address having a number of address bits, the selected ingress buffer comprises a packet pointer queue comprising a plurality registers each configured to store a packet pointer including a number of data bits for identifying a storage unit in the header portion of the random access memory, and the number of data bits is less than the number of address bits.

17. The integrated circuit device of claim 12, wherein the ingress controller is further configured to maintain a circular header list containing header pointers each identifying a storage unit in the header portion of the random access memory containing a packet header.

18. The integrated circuit device of claim 17, wherein the ingress controller is further configured to maintain a circular data list configured to store data pointers each identifying a storage unit in the data portion of the random access memory containing a data segment of a packet, the ingress controller further configured to compute a cyclical redundancy check code for a packet stored in the random access memory of the selected ingress buffer, determine whether the stored packet is a corrupt packet based on the cyclical redundancy check code, and delete the stored packet from the random access memory of the selected ingress buffer if the stored packet is a corrupt packet by deleting from the circular header list the header pointer identifying a storage unit in the header portion of the random access memory storing the packet header of the corrupt packet and deleting from the circular data list each data pointer identifying a storage unit of a data segment of the corrupt packet.

19. The integrated circuit device of claim 14, wherein the ingress controller is further configured to logically combine the random access memories of at least two ingress buffers of the plurality of ingress buffers into a logical ingress port, each of the at least two ingress buffers having an input data bandwidth, the logical ingress port having an input data bandwidth being higher than the input data bandwidth of each ingress buffer of the at least two ingress buffers.

20. The integrated circuit device of claim 12, wherein the selected ingress port is further configured to receive a packet by receiving a sequence of data portions of the packet in a corresponding sequence of time periods, the packet switch further comprising a scheduler coupled to the plurality of ingress ports and the plurality of egress ports and configured to identify an egress port of the plurality of egress ports as a destination egress port for the packet, schedule the packet to be routed from the selected ingress port to the destination egress port in a sequence of successive routing periods, and determine an initial routing period of the sequence of successive routing periods based on an input data bandwidth of the selected ingress port and an output data bandwidth of the destination egress port to prevent any discontinuity in routing the data portions in the sequence of successive routing periods.

21. A method of routing packets through a packet switch, the method comprising:

selecting an ingress buffer in an ingress port of a packet switch, the ingress buffer including a random access memory having a storage capacity for storing data;

allocating the storage capacity of the random access memory among a plurality of transaction types by allocating a plurality of credits to each transaction type of the plurality of transaction types for the selected ingress buffer;

issuing the plurality of credits of each transaction type of the plurality of transaction types from the packet switch;

maintaining a free header list containing header pointers each identifying an available storage unit in a header portion of the random access memory; and maintaining a free data list containing data pointers each identifying an available storage unit in a data portion of the random access memory;

receiving a first packet at the ingress port, the first packet having a transaction type of the plurality of transaction types;

storing the first packet into the random access memory based on the credits allocated to the transaction type of the packet for the selected ingress buffer;

identifying an egress port of the packet switch as a destination egress port for the first packet;

routing the first packet from the selected ingress buffer to the destination egress port; and issuing at least one credit from the packet switch in response to routing the first packet from the selected ingress buffer to the destination egress port.

22. The method of claim 21, wherein the plurality of credits of a transaction type includes a header credit indicating an available storage capacity of the random access memory of the selected ingress buffer for storing a packet header of a packet having the transaction type, and a data credit indicating an available storage capacity of the random access memory of the selected ingress buffer for storing a data segment of a data payload of a packet having the transaction type.

23. The method of claim 22, further comprising dynamically reallocating the storage capacity of the random access memory in the selected ingress buffer among the plurality of transaction types by deallocating at least one credit of the plurality of credits allocated to a first transaction type of the plurality of transaction types and allocating at least one credit to a second transaction type of the plurality of transaction types.

24. The method of claim 21,
wherein the header portion of the random access memory is configured to store both a packet header of a packet and a data pointer to a storage unit in the data portion of the random access memory for storing a first data segment of a data payload of the packet.

25. A method of routing packets through a packet switch, the method comprising:

selecting an ingress buffer in an ingress port of a packet switch, the ingress buffer including a random access memory having a storage capacity for storing data;

allocating the storage capacity of the random access memory among a plurality of transaction types by allocating a plurality of credits to each transaction type of the plurality of transaction types for the selected ingress buffer;

issuing the plurality of credits of each transaction type of the plurality of transaction types from the packet switch;

maintaining a circular header list of header pointers each identifying a storage unit in a header portion of the random access memory containing a packet header of the packet;

maintaining a circular data list of data pointers each identifying a storage unit in a data portion of the random access memory containing a data segment of a packet;

receiving a first packet at the ingress port, the first packet having a transaction type of the plurality of transaction types;

storing the first packet into the random access memory based on the credits allocated to the transaction type of the packet for the selected ingress buffer;

identifying an egress port of the packet switch as a destination egress port for the first packet;

routing the first packet from the selected ingress buffer to the destination egress port; and issuing at least one credit from the packet switch in response to routing the first packet from the selected ingress buffer to the destination egress port.

26. The method of claim 25, further comprising:

receiving a second packet at the selected ingress buffer;

storing the second packet into the random access memory;

computing a cyclical redundancy check code for the second packet;

determining whether the second packet is a corrupt packet based on the cyclical redundancy check code; and deleting the second packet from the random access memory if the second packet is a corrupt packet by deleting from the circular header list a header pointer identifying a storage unit in the header portion of the random access memory storing a packet header of the corrupt packet and by deleting from the circular data list each data pointer identifying a storage unit in the data portion of the random access memory storing a data segment of the corrupt packet.

27. An integrated circuit device including a packet switch, the packet switch comprising:

a plurality of egress ports configured to output packets from the packet switch;

a plurality of ingress ports selectively coupled to the plurality of egress ports and including a corresponding plurality of ingress buffers each comprising a random access memory having a storage capacity for storing data including a header portion including a plurality of storage units each having a storage capacity for storing a packet header and a data portion including a plurality of storage units each having a storage capacity for storing a data segment; and an ingress controller coupled to the plurality of ingress ports and configured to allocate the storage capacity of the random access memory in a selected ingress buffer of the plurality of ingress buffers among a plurality of transactions types by allocating a plurality of credits to each transaction type of the plurality of the transaction types for the selected ingress buffer, the ingress buffer further configured to dynamically reallocate the storage capacity of the random access memory in the selected ingress buffer among the plurality of transaction types by deallocating at least one credit of the plurality of credits allocated to a first transaction type so as to decrease the number of storage units allocated to the first transaction type and allocating at least one credit to a second transaction type of the plurality of packet types so as to increase the number of storage units allocated to the second transaction type.

* * * * *